Jan. 25, 1966  J. S. BOZEK  3,230,602
PLASTIC BOTTLE NECK REAMING MACHINE
Filed March 28, 1962  16 Sheets-Sheet 3

INVENTOR.
JOHN S. BOZEK
BY
Mason, Porter, Diller & Stewart
ATTORNEYS

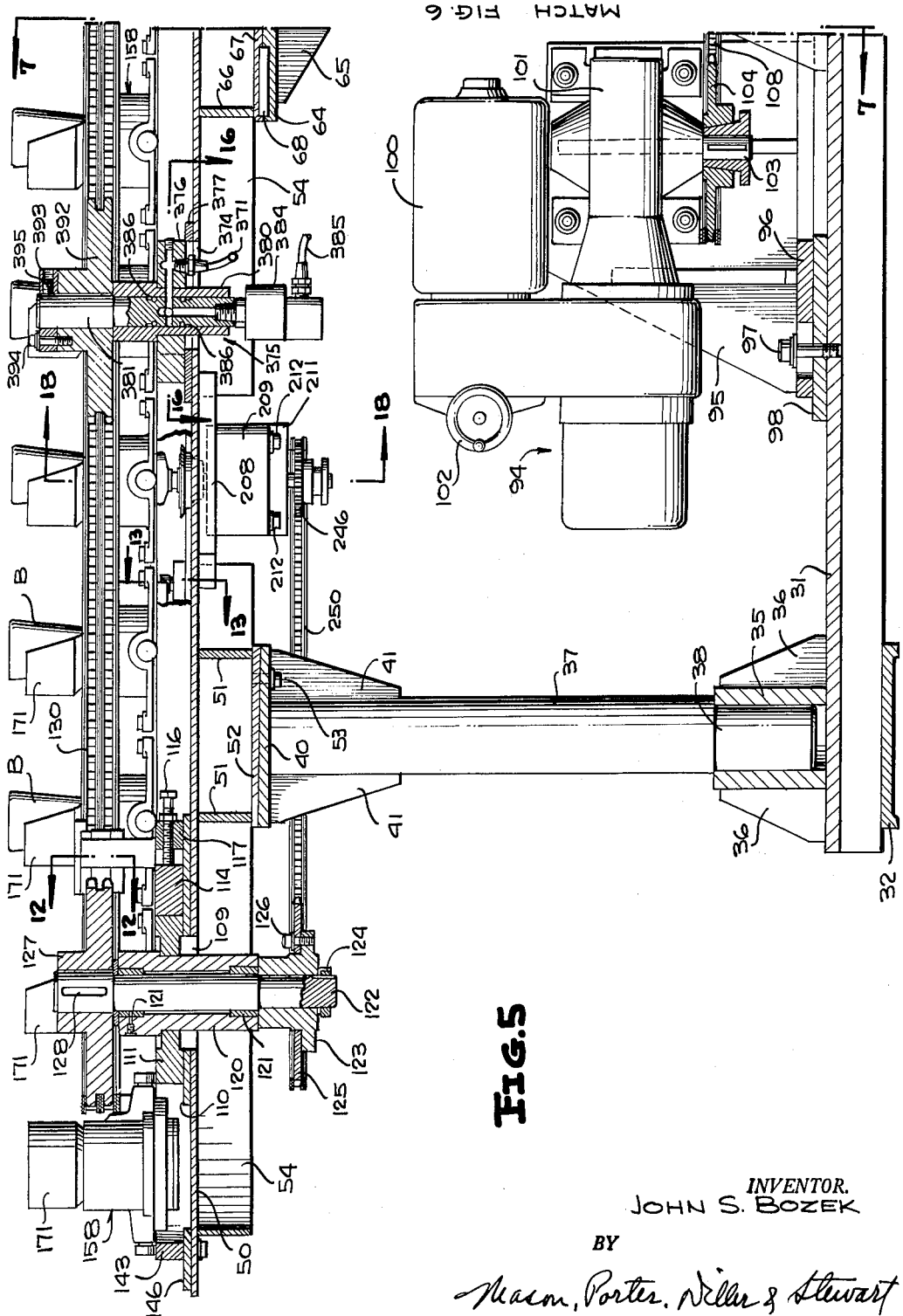

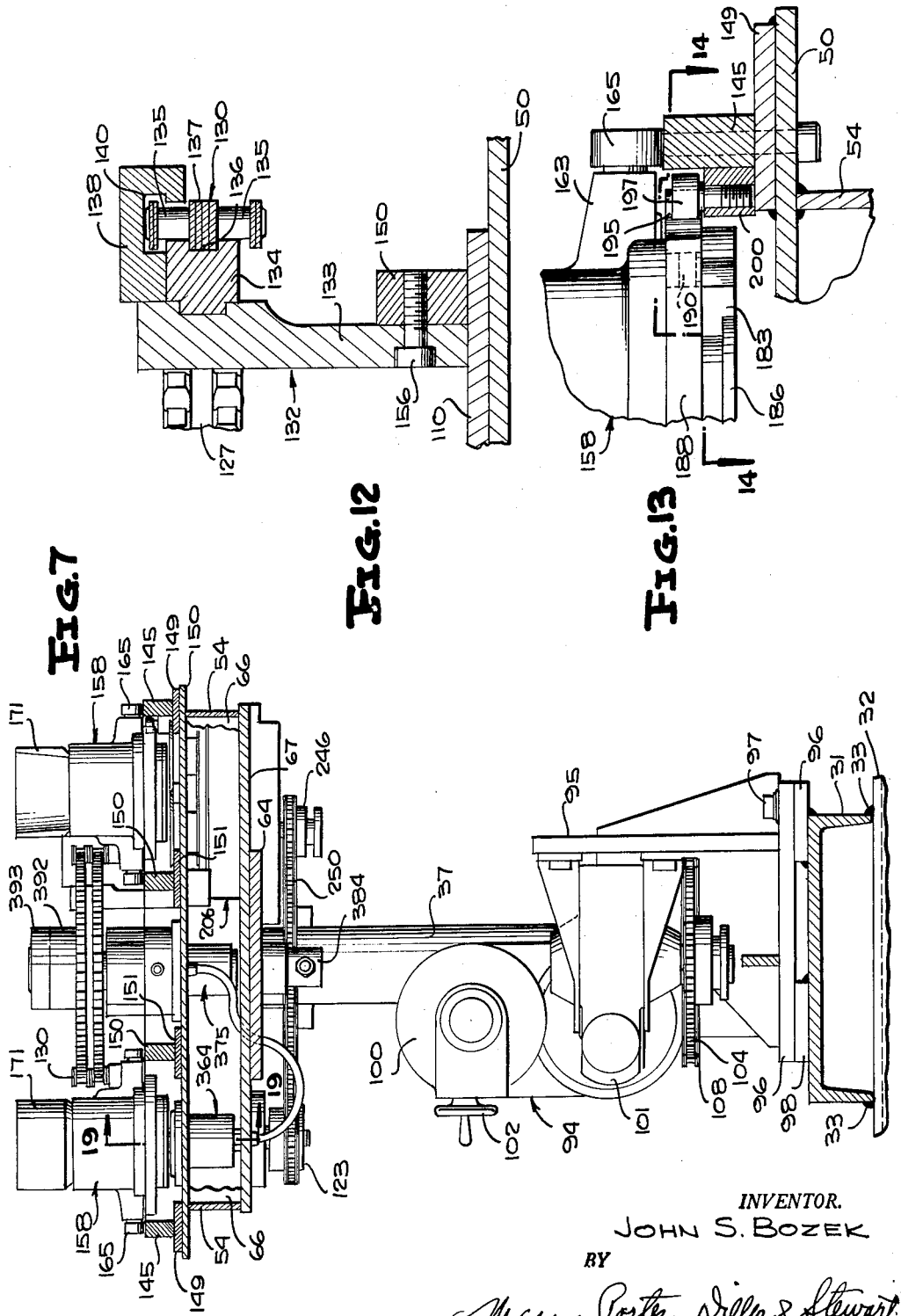

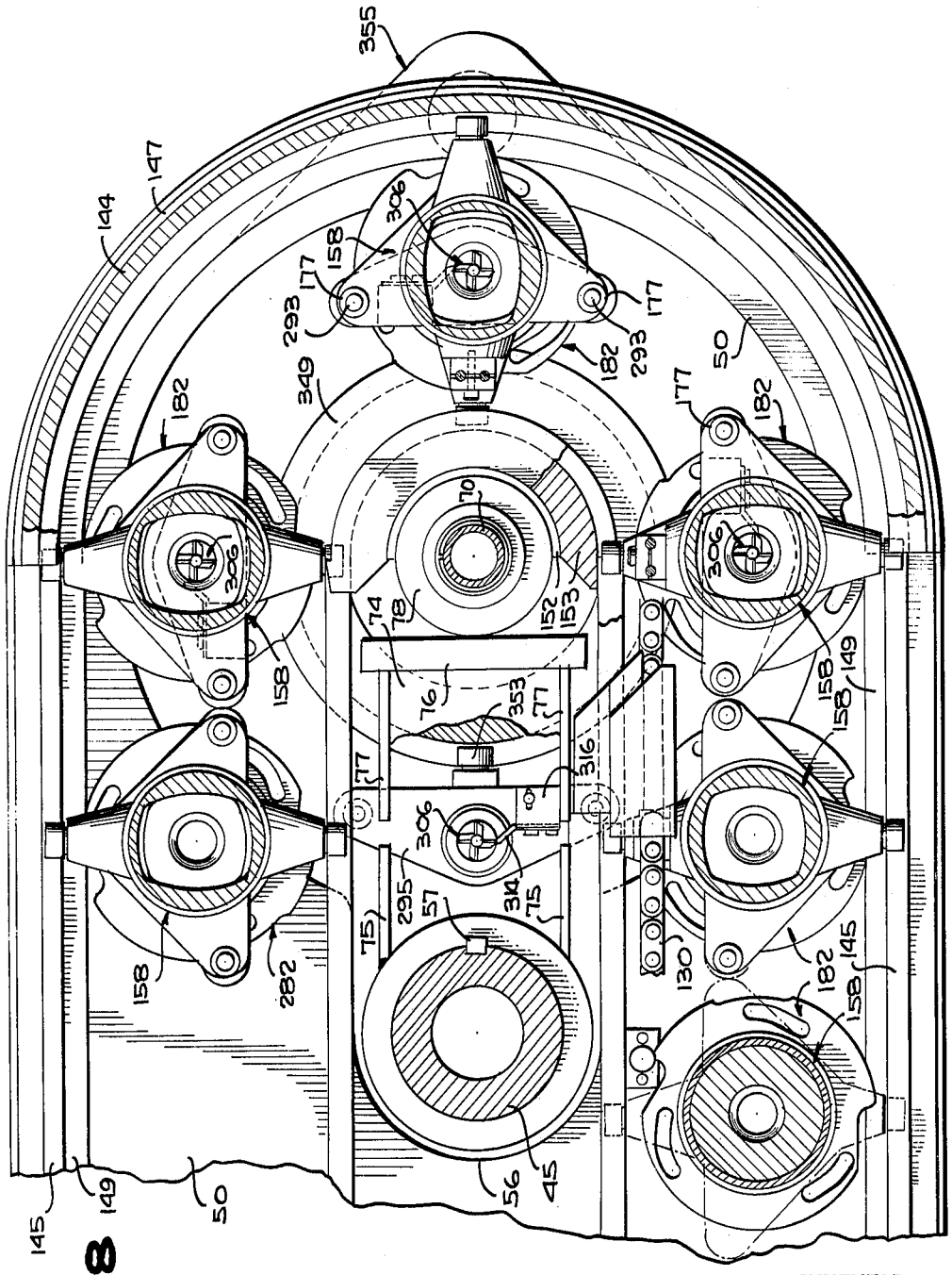

Jan. 25, 1966  J. S. BOZEK  3,230,602
PLASTIC BOTTLE NECK REAMING MACHINE
Filed March 28, 1962  16 Sheets-Sheet 8
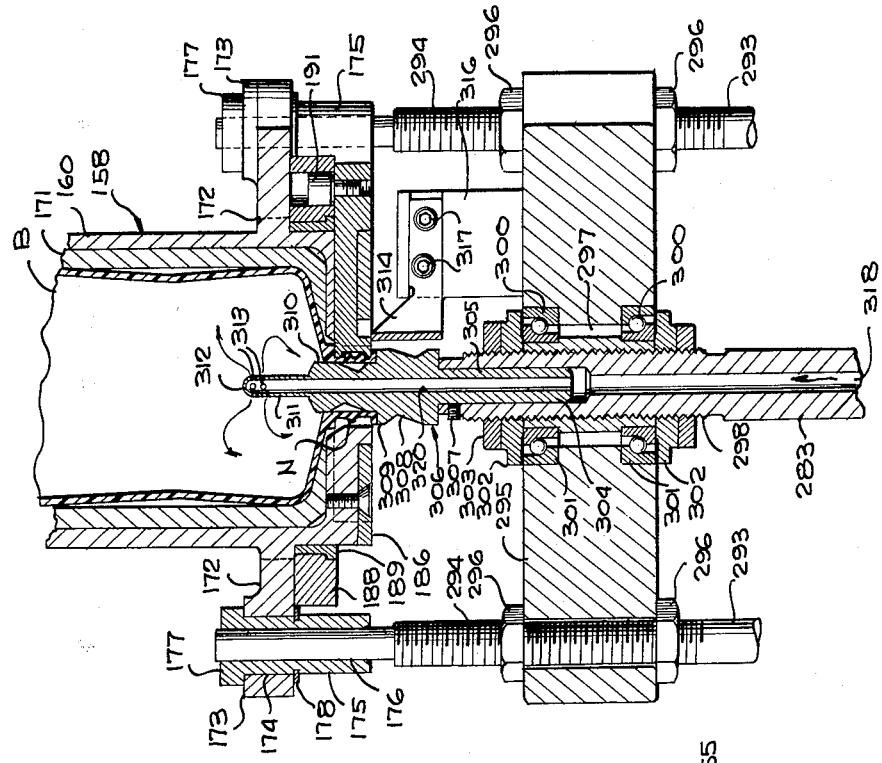
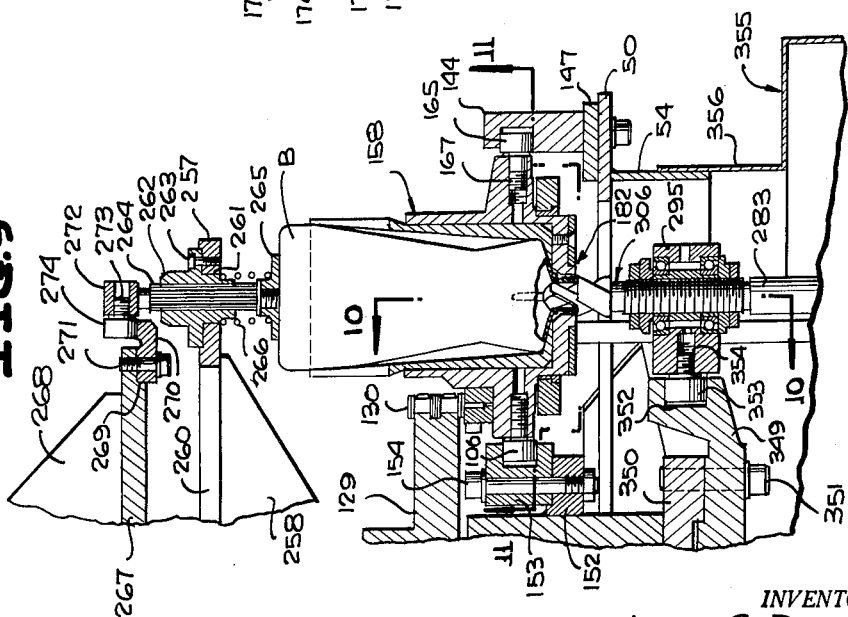
INVENTOR.
JOHN S. BOZEK
BY
Mason, Porter, Diller & Stewart
ATTORNEYS

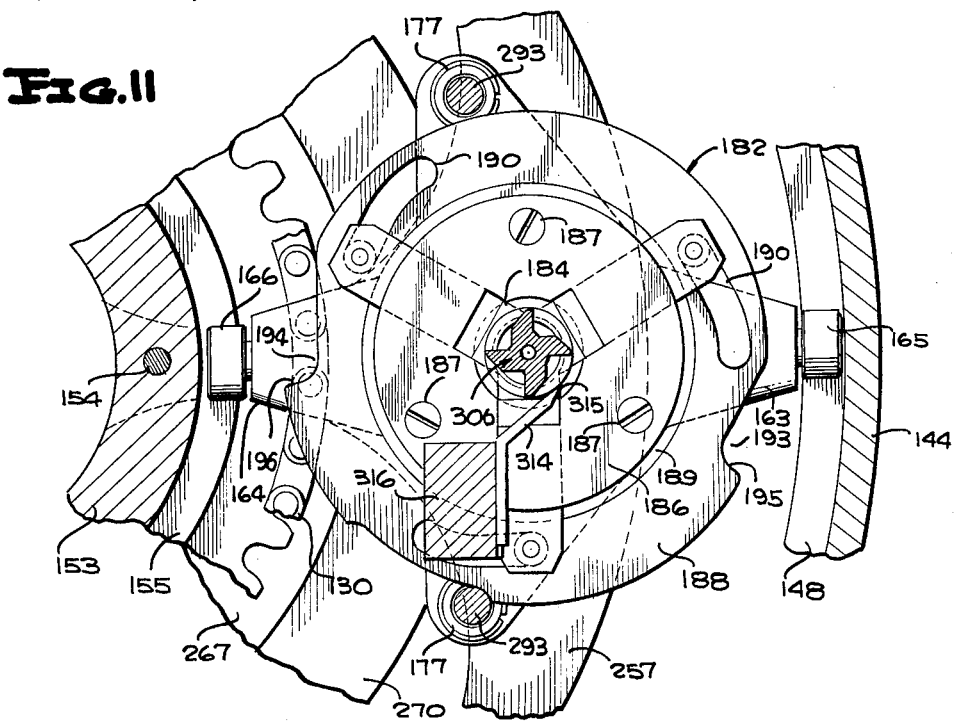
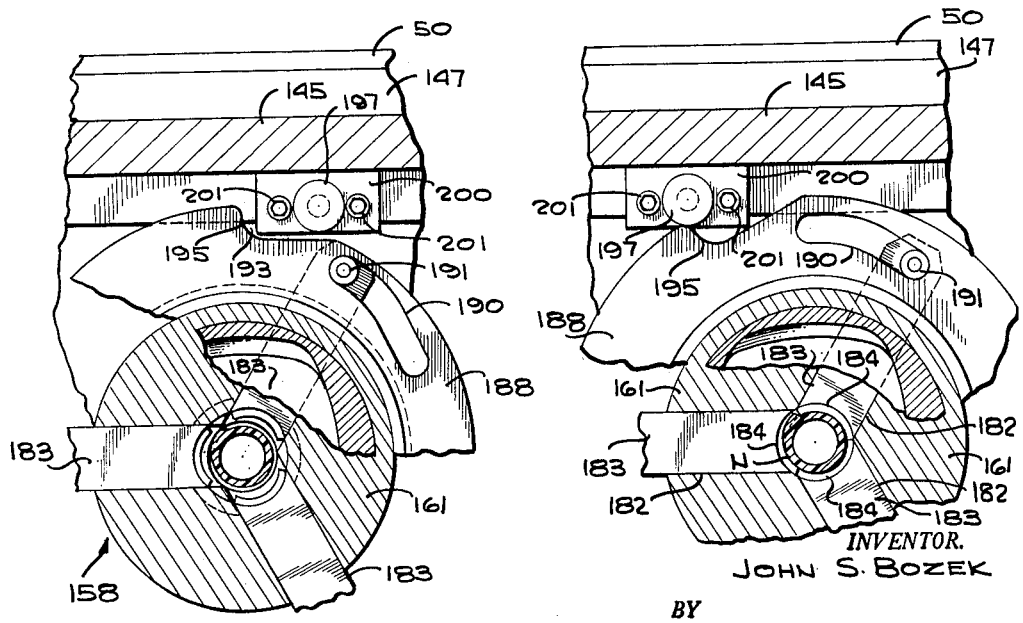

Jan. 25, 1966  J. S. BOZEK  3,230,602
PLASTIC BOTTLE NECK REAMING MACHINE
Filed March 28, 1962  16 Sheets-Sheet 10

INVENTOR
JOHN S. BOZEK
BY Mason, Porter, Diller & Stewart
ATTORNEYS

INVENTOR.
JOHN S. BOZEK
BY
Mason, Porter, Diller & Stewart
ATTORNEYS

Jan. 25, 1966 J. S. BOZEK 3,230,602
PLASTIC BOTTLE NECK REAMING MACHINE
Filed March 28, 1962 16 Sheets-Sheet 12

INVENTOR.
JOHN S. BOZEK
BY
Mason, Porter, Diller & Stewart
ATTORNEYS

Jan. 25, 1966   J. S. BOZEK   3,230,602
PLASTIC BOTTLE NECK REAMING MACHINE
Filed March 28, 1962   16 Sheets-Sheet 13

INVENTOR
JOHN S. BOZEK
BY
Mason, Porter, Diller & Stewart
ATTORNEYS

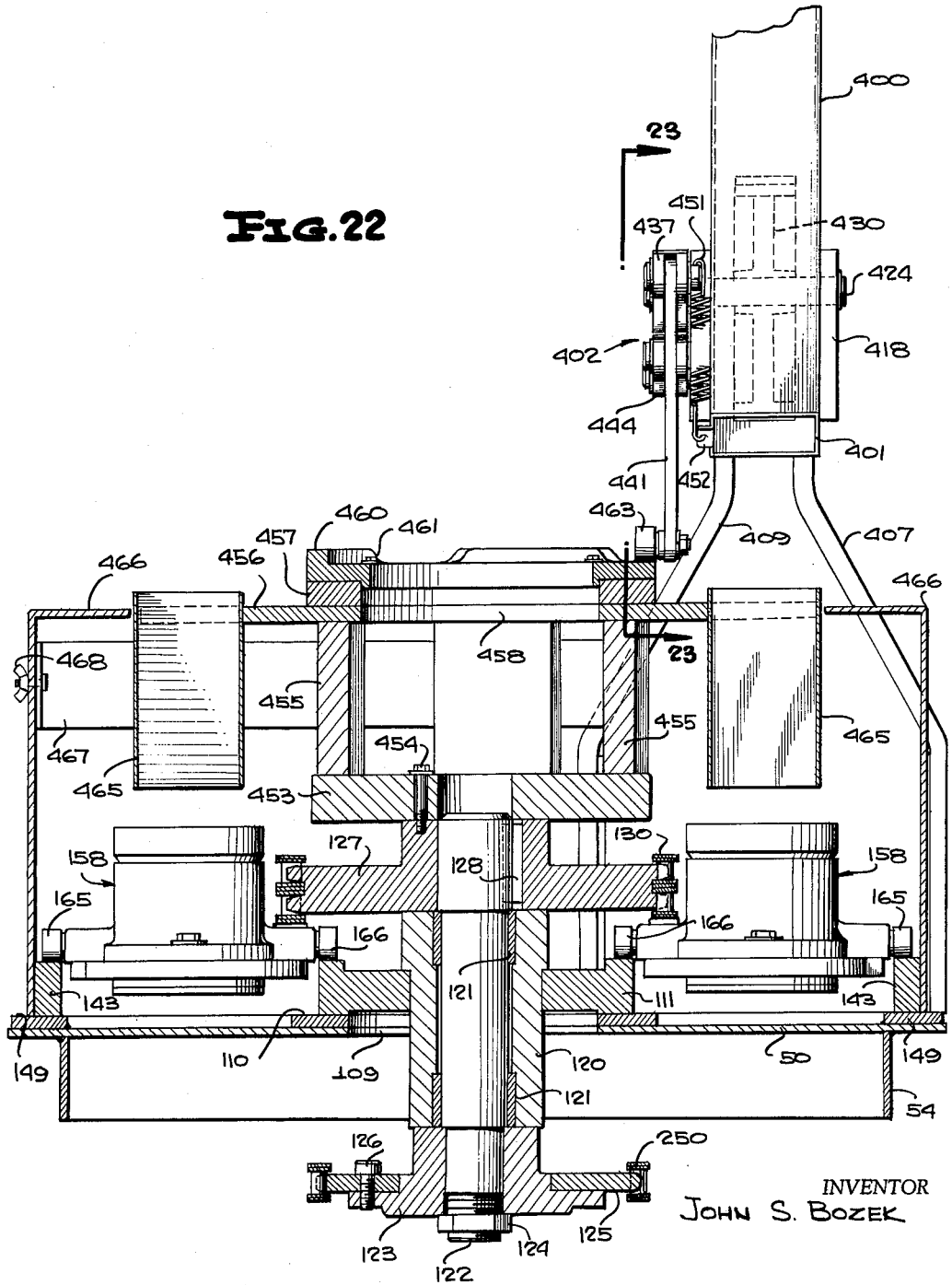

Jan. 25, 1966    J. S. BOZEK    3,230,602
PLASTIC BOTTLE NECK REAMING MACHINE
Filed March 28, 1962    16 Sheets-Sheet 15
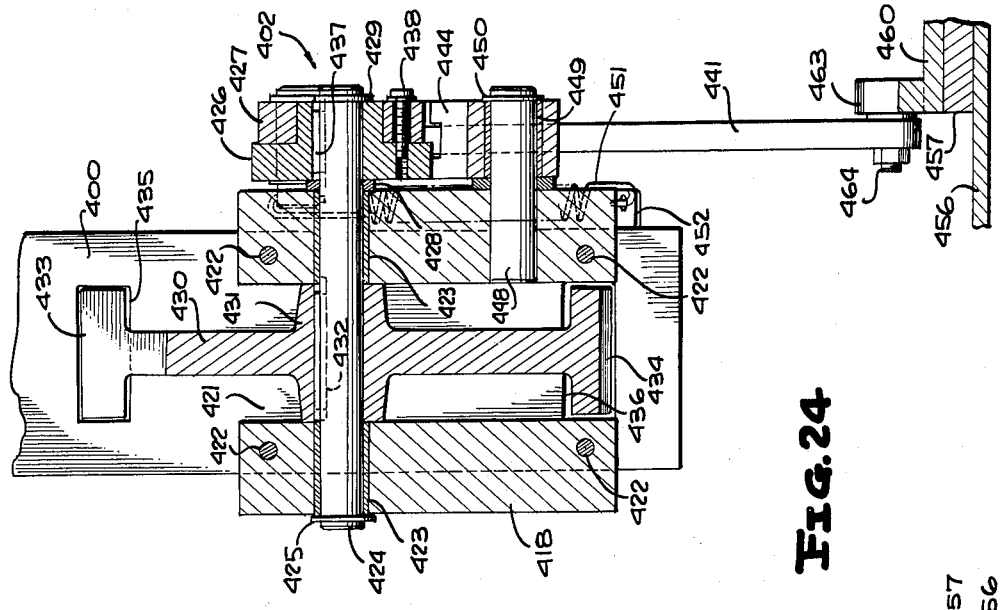
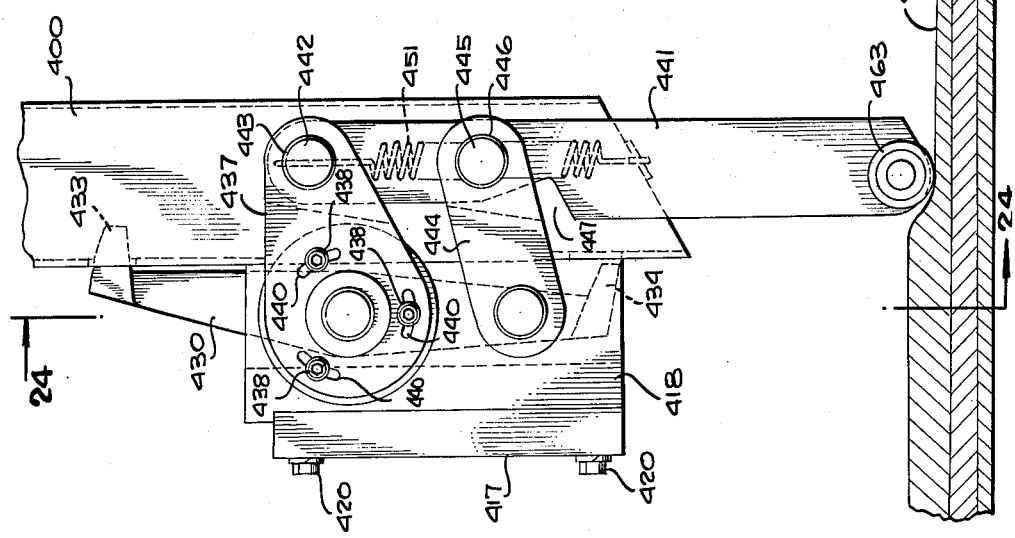
INVENTOR
JOHN S. BOZEK
BY
Mason, Porter, Diller & Stewart
ATTORNEYS

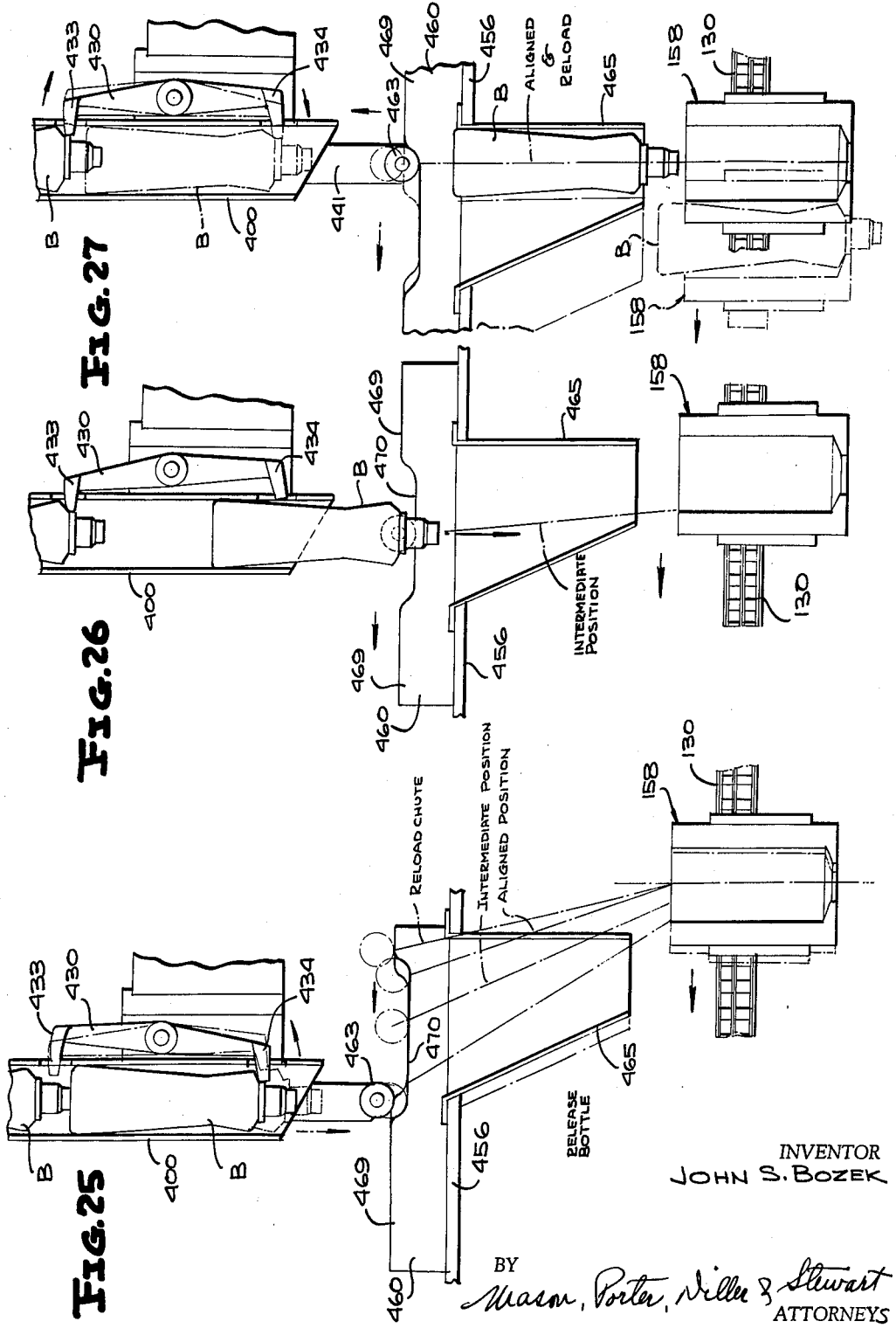

United States Patent Office 3,230,602
Patented Jan. 25, 1966

3,230,602
PLASTIC BOTTLE NECK REAMING MACHINE
John S. Bozek, Chicago, Ill., assignor to Continental Can Company, New York, N.Y., a corporation of New York
Filed Mar. 28, 1962, Ser. No. 183,130
26 Claims. (Cl. 29—33)

This invention relates in general to new and useful apparatus particularly adapted for use in the manufacture of plastic bottles, and more particularly relates to a novel plastic bottle neck reaming machine.

This invention has to do with the finishing of the neck of a plastic bottle which has been formed by a blow molding process and which, when initially molded, is provided with an extension on the neck which is closed and which must be removed, after which the neck must be internally reamed and end faced. In the present manufacture of plastic bottles, after the bottles have been blow-molded, the bottles are first delivered to a neck extension shearing machine wherein extending portions of the necks of the bottles are sheared. Then, the bottles are delivered to a neck finishing station wherein an operator places the bottles in inverted positions in suitable holders which are indexed and when the bottles are indexed at certain stations of the machine, the necks of the bottles are finished. The present process of finishing necks of plastic bottles is too expensive due to the necessary manual steps and the slow operation of a machine which must be indexed between each operation.

It is therefore the primary object of this invention to provide a machine which will automatically receive plastic bottles in inverted positions from a suitable bottle conveyor and which will continuously move the bottles about a predetermined path, during which movement the extensions on the necks of the bottles will be sheared, after which suitable reaming operations will take place on the neck of each bottle to finish the bottle both internally and at the end of the neck, after which the bottles will automatically be discharged from the machine without the stopping of the machine.

Another object of this invention is to provide an automatic machine for reaming necks of plastic bottles, the machine including an endless conveyor carrying a plurality of bottle holders, means for continuously moving the endless conveyor and bottle holders, and bottle neck reaming means cooperable with the holders to effect the necessary reaming operations on bottles carried by the holders while the holders are being continuously moved.

Yet another object of this invention is to provide a novel machine for reaming the necks of plastic bottles, the machine including a plurality of bottle holders which are mounted for continuous movement about a predetermined path of which at least a portion is arcuate, and a plurality of reaming tools are mounted for movement about the same arcuate path as the holders with the reaming tools being engaged by means for automatically projecting and retracting the reaming tools whereby the necessary neck reaming operation may take place on bottles carried by the holders during the continuous movement of the holders.

Still another object of this invention is to provide an automatic plastic bottle neck reaming machine which automatically receives plastic bottles, automatically fixedly clamps the plastic bottles in holders, automatically cuts off the projecting portions of the necks of plastic bottles, automatically reams the necks of plastic bottles, and automatically discharges the finished plastic bottles.

A further object of this invention is to provide in a machine for automatically reaming necks of plastic bottles, bottle holders which are adapted to receive falling bottles in inverted positions and which have clamp means for effectively clamping the necks of the plastic bottles within the holders and against any movement whatsoever whereby the bottles to have neck reaming operations performed thereon are rigidly and fixedly, as well as accurately, clamped within the holders for the necessary operations to be performed thereon.

A still further object of this invention is to provide novel apparatus for reaming necks of plastic bottles seated in holders, the apparatus including continuously moving means for operating on the bottles which move at the same rate as the bottle holders and which means includes a plurality of spindles carrying reaming tools and a like number of hold-down members opposing the spindles, the hold-down members and the spindles having associated therewith cams whereby as the spindles and hold-down members move, the hold-down members are first brought into engagement with the bottoms of bottoms to be reamed in opposition to the spindles and then the spindles are moved towards the bottles so that the reaming tools carried thereby may effect the necessary bottle reaming operations.

Yet another object of this invention is to provide a novel reaming tool for use in reaming necks of plastic bottles, the reaming tool including a first portion for internally reaming the neck of a plastic bottle, and a second portion for end reaming or milling the end of the neck of a plastic bottle to provide the necessary flat end surface thereon.

Still another object of this invention is to provide a novel tool for reaming the necks of plastic bottles, the tool including a reamer portion for internally reaming the neck of a plastic bottle, the reamer having cutting edges arranged for automatically feeding the reamed portions of the neck out through the neck of a bottle, and there being associated with the tool a cutting break-off member so as to automatically break the shavings resulting from the reaming operation into small pieces.

In the bottle neck reaming apparatus now in use, a problem of removing chips from within the interior of a bottle has been encountered. Due to the electrical charges on the chips, the chips have a tendency to adhere to the interior surface of a bottle once they have entered into the bottle. It is therefore a still further object of this invention to provide a novel plastic bottle neck reaming tool which includes an air duct for initially pressurizing the interior of a bottle being reamed and for effecting the outward flow of air around the reaming tool during the neck reaming operation whereby any small chips formed by the reaming tool are forced out through the neck and cannot enter into the bottle, whereby the problem of chips from a reaming operation being deposited in a bottle is eliminated.

Another object of the invention is to provide in an automatic machine for reaming the necks of plastic bottles a plurality of holders which are mounted for continuous movement about a predetermined path, and a plurality of bottle reaming tools which are mounted for continuous movement along a portion of the path of the bottle holders, and means for temporarily locking together the bottle holders and the support for the bottle reamers whereby alignment of the bottle reamers with bottles during a bottle neck reaming operation is assured.

Still another object of this invention is to provide in an automatic machine for performing operations on plastic bottles means for automatically delivering plastic bottles to holders of the machine, the means including an endless conveyor which is driven at the same rate as the holders for bottles whereby the endless conveyor supplies a bottle to each holder.

Another object of this invention is to provide in an automatic machine for performing operations on plastic bottles means for automatically discharging bottles from the machine, the machine including an air jet operable for discharging air up through a bottle holder to eject a bottle from the bottle holder, and valve means automatically timed for effecting the air jet in response to positioning of a bottle holder in alignment with a bottle receiving guide.

In accordance with this invention, bottle holders are provided for receiving bottles in inverted positions and for supporting the bottles upright so that the necks of the bottles are vertically disposed. These bottle holders are continuously moved with the result that the bottles must be accurately fed to the bottle holders in the proper timed relation. Further, the bottles must be vertically disposed within the holders as they drop therein in order that they may assume and maintain the upright inverted position. It is therefore a still further object of this invention to provide novel means for automatically placing bottles in the bottle holders, the means including a chute wherein a supply of bottles is maintained with the chute overlying the path of the bottle holders, and there being provided suitable guide means for assuring the movement of a bottle dropped from the chute into a respective one of the bottle holders.

Yet another object of this invention is to provide novel means for automatically delivering bottles stored within a chute to moving bottle holders passing beneath the chute, the means including bottle releasing mechanism carried by the chute for releasing a single bottle at a time, the bottle releasing mechanism being controlled in timed relation to the movement of a bottle holder with respect to the chute.

Yet another object of this invention is to provide a mechanism for automatically transferring bottles to moving bottle holders without stopping the movement of the bottle holders, the means including a generally vertically disposed chute having a supply of bottles stored therein, bottle releasing mechanism carried by the chute for releasing a single bottle at a time, and guide means movable with the bottle holders and in overlying relation thereto as the bottle holders pass beneath the chute whereby a bottle dropped from the chute passes through the guide means with the guide means assuring the proper positioning of the bottle within an associated holder, and there further being provided means for operating the bottle releasing mechanism of the chute in timed relation to the movement of a holder relative to the chute.

With the above and other objects in view that will hereinafter appear, the nature of the invention will be more clearly understood by reference to the following detailed description, the appended claims and the several views illustrated in the accompanying drawings:

In the drawings:

FIGURE 4 is a horizontal sectional view taken along the line 4—4 of FIGURE 2, and shows generally the details of the base of the machine and the drive mechanism thereof.

FIGURE 5 is an enlarged fragmentary longitudinal sectional view taken along the line 5—5 of FIGURE 1, and shows the specific structural details of the machine, including the details of a valve for controlling the discharge of bottles.

FIGURE 7 is an enlarged transverse vertical sectional view taken along the line 7—7 of FIGURE 5, and shows the specific details of the machine in the general area of the bottle discharge station.

FIGURE 8 is an enlarged fragmentary horizontal sectional view taken along the line 8—8 of FIGURE 6, with parts broken away and removed, and shows more specifically the details of the machine in the area of the bottle reaming mechanism.

FIGURE 9 is an enlarged fragmentary vertical sectional view taken along the line 9—9 of FIGURE 3, and shows the specific details of the bottle reaming mechanism during a bottle reaming operation.

FIGURE 10 is a transverse vertical sectional view on a much larger scale, taken along the line 10—10 of FIGURE 9, and shows more specifically the details of the bottle reaming mechanism and the relationship thereof with respect to a bottle during the bottle reaming operation.

FIGURE 11 is an enlarged fragmentary horizontal sectional view taken along the line 11—11 of FIGURE 9 viewing one of the bottle holders from underneath and showing the specific details of the bottle reaming tool, including the means for breaking up the cuttings from the reamer portion of the tool.

FIGURE 12 is an enlarged fragmentary transverse vertical sectional view taken along the line 12—12 of FIGURE 5, and shows the general details of the combined chain guide and support for the endless chain which moves the bottle holders about the predetermined path thereof.

FIGURE 13 is an enlarged fragmentary transverse vertical sectional view taken along the line 13—13 of FIGURE 5, and shows the specific details of the mechanism for effecting the closing of the neck clamp of each bottle holder subsequent to the placing of a bottle therein to hold the bottle securely within its associated holder.

FIGURE 14 is an enlarged fragmentary horizontal sectional view taken along the line 14—14 of FIGURE 13, with parts broken away, and shows the clamp mechanism of the bottle holder immediately prior to the engagement thereof with the clamp actuating means of FIGURE 13.

FIGURE 15 is a horizontal sectional view similar to FIGURE 14, and shows the clamp of the holder of FIGURE 14 after it has been actuated to engage the neck of a bottle disposed within the associated holder.

FIGURE 22 is an enlarged fragmentary transverse vertical sectional view taken along the line 22—22 of FIGURE 21, and shows the specific details of the mechanism for effecting the feeding of bottles from a chute into the bottle holders.

FIGURE 23 is an enlarged fragmentary vertical sectional view taken along the line 23—23 of FIGURE 22, and shows the specific details of the bottle releasing mechanism carried by the chute.

FIGURE 24 is an enlarged fragmentary vertical sectional view taken along the line 24—24 of FIGURE 23, and shows the specific details of the bottle releasing mechanism.

FIGURES 25, 26 and 27 are schematic elevational views with parts broken away and shown in section of the bottle feed and show the specific relation of various components thereof as a bottle is being fed from the chute into one of the bottle holders.

Figure 6:
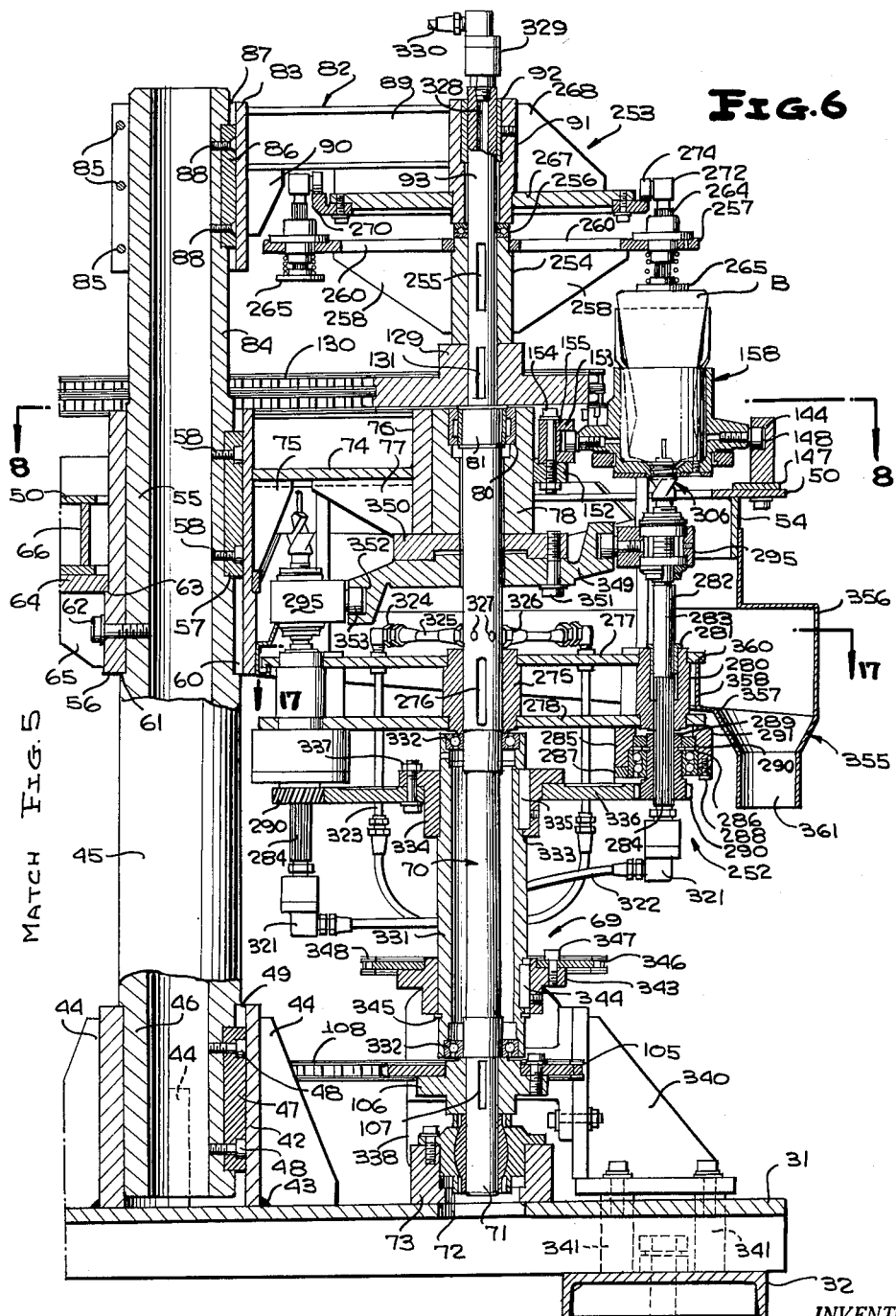
FIGURE 6 is an enlarged fragmentary longitudinal sectional view taken along the line 6—6 and is in effect a continuation of FIGURE 5, the view showing more specifically the details of the bottle reaming mechanism.

Referring now to the drawings in detail, it will be seen that the plastic bottle neck reaming machine, which is the subject of this invention, is generally referred to by the numeral 30. The machine 30 includes an elongated base member 31, which, as is best shown in FIGURE 7, is of an inverted channel shape. The base member 31 extends longitudinally of the machine 30 and is supported at the opposite ends thereof by transversely extending feet 32 which are also of an inverted channel shape, as is best shown in FIGURE 6. The base member 31 is secured to the feet 32 in any suitable manner, including the welding 33 shown, for example in FIGURE 7. Suitable bolts 34 are provided at each of the feet 32 for leveling the machine on a suitable foundation, such as a floor.

As is best shown in FIGURES 4 and 5, the base member 31 is provided with a short sleeve 35 in overlying relation to that portion of the base member 31 beneath which the associated foot 32 passes. The sleeve 35 is disposed upright and is secured to the base member 31 in any suitable manner, including by welding. The sleeve 35 is braced against upset by a plurality of circumferentially spaced braces 36. The sleeve 35 carries a column 37 which has a reduced cross-sectional lower end 38 telescoped within the sleeve 35.

The upper end of the column 37 is provided with a suitable support plate 40. The support plate 40 is braced relative to the column 37 by circumferentially spaced braces 41.

Referring once again to FIGURE 4 in particular, it will be seen that a second sleeve 42 extends upwardly from the base member 31 intermediate the feet 32, but nearer the right hand foot than the left hand foot. The sleeve 42, as is best shown in FIGURE 6, is secured to the base member 31, as by welding 43. The sleeve 42 is braced against overturn from its upstanding position by a plurality of circumferentially spaced braces 44.

The sleeve 42 carries an upstanding column 45 which has a reduced cross-sectional lower portion 46 telescoped within the sleeve 42. The lower portion 46 of the column 45 is provided with a longitudinally extending key 47 which is suitably secured to the lower portion 46 by means of fasteners 48. The sleeve 42 is provided with an internal keyway 49 in which the key 47 is received so as to prevent rotation of the column 45 within the sleeve 42.

The columns 37 and 45 serve to support an elongated, generally rectangular table 50 which has rounded ends. The table 50 extends beyond the left hand end of the base member 31, as is shown in FIGURE 5, and has the left hand portion thereof supported by the column 37. In order to facilitate the mounting of the table 50 on the column 37, there is secured to the underside of the table 50 two transversely extending support members 51. The support members 51 have the lower edges thereof secured to a transversely extending plate 52 which corresponds to the plate 40 carried at the upper end of the column 37. The plate 52 rests upon the plate 40 and is releasably secured thereto by suitable fastening means, of which one fastener 53 is illustrated in FIGURE 5.

The table 50 is braced against flexing by a depending stiffener 54 which extends substantially entirely about the periphery of the table 50 and inset slightly from the peripheral edge thereof. The opposite ends of the supports 51 are suitably secured to the stiffener 54.

Referring now to FIGURE 6 in particular, it will be seen that the column 45 has an intermediate upper portion 55 which is of a reduced diameter and which carries a sleeve 56. The portion 55 of the column 45 is provided with a key 57 which is secured thereto by means of suitable fasteners 58. The key 57 is seated in a vertical keyway 60 formed internally in the sleeve 56 so as to prevent relative turning of the sleeve 56 on the column 45. The lower end of the sleeve 56 rests upon a shoulder 61 resulting from the reduction in diameter of the column 45. The sleeve 56 is retained in place on the column 45 by means of a fastener 62.

It is to be noted that the sleeve 56 has a lower portion of a slightly larger diameter than the upper portion thereof, thereby forming a shoulder 63. A supporting plate 64 encircles the sleeve 56 and rests upon the shoulder 63. The supporting plate 64 is braced by means of suitable braces 65 extending radially outwardly from the sleeve 56.

A pair of transversely extending supports 66 are secured to the underside of the table 50 to the left of the column 45 with the ends of the supports 66 being secured to the stiffener 54. A mounting plate 67 extends transversely of the table 50 and is secured to the support 66 and to the stiffener 54, as is clearly shown in FIGURES 5, 6 and 7. The mounting plate 67 rests upon the plate 64 and is suitably secured thereto in any desired manner. In order to assure alignment of the plates 64 and 67, a key 68 is provided, as is best shown in FIGURE 5.

The right portion of the base member 31 supports a vertical spindle assembly, generally referred to by the numeral 69. The spindle assembly 69 includes a spindle 70. The spindle 70 includes many portions of different diameters and the lower portion 71 thereof is rotatably journaled in a self-aligning bearing 72 of a conventional type, with the bearing 72 being mounted in a suitable bearing holder 73 carried by the base members 31.

The sleeve 56 has a horizontal support 74 extending to the right therefrom, as viewed in FIGURE 6. The support 74 is braced from the sleeve by means of suitable diagonal braces 75. A vertical plate 76 is secured to the right end of the support 74 and is braced relative to the support 74 by means of suitable braces 77. A sleeve 78 is suitably secured to the plate 76 in alignment with the bearing support 73. A conventional type of roller bearing 80 is carried by an upper part of the sleeve 78 and is in engagement with the journal portion 81 of the spindle 70.

The spindle 70 is further supported by an upper support, generally referred to by the numeral 82. The upper support 82 includes a sleeve 83 which is carried by a reduced upper portion 84 of the column 45. The sleeve 83 is of the split type and is drawn together by means of suitable fasteners 85. The sleeve is prevented from rotating relative to the column 45 by means of a key 86 which is received in a keyway 87 formed internally in the sleeve 83. The key 86 is secured to the column by means of suitable fasteners 88.

A rigid arm 89 extends to the right from the upper part of the sleeve 83 and is braced relative to the sleeve 83 by means of suitable gussets or braces 90. A bearing sleeve 91 is carried by the right end of the arm 89. The bearing sleeve 91 carries a suitable bushing 92 in which there is rotatably journaled an upper portion 93 of the spindle 70. It is to be understood that in lieu of the bushing 92, other suitable anti-friction means may be utilized.

From the foregoing, it will be seen that the spindle 70 is supported for rotation at its lower end by the self-aligning bearing 72, and the upper central portion thereof, by the roller bearing 80, and at the upper end thereof by the bushing 92. Thus, the spindle 70 is rigidly fixed against movement other than rotary movement and at the same time, is suitably journaled for rotation, as is required in the operation of the machine 30.

In order to rotate the spindle 70, a power unit, generally referred to by the numeral 94, is mounted on the base member 31 between the columns 37 and 45. The power unit 94 is carried by a suitable mounting bracket 95 which has a base plate 96 which is secured to the base member 31 by means of suitable fasteners 97. Suitable spacer means 98 are disposed intermediate the base plate 96 and the base member 91.

It is to be understood that the power unit 94 is of the variable speed type and includes an electric motor 100 which is suitably coupled to a speed reduction unit 101 of a conventional type and which has the output ratio thereof varied through the manipulation of a handle 102. The speed reduction unit 101 has an output shaft 103 on which there is mounted a drive sprocket 104. The drive sprocket 104 is horizontally disposed and is in alignment with a driven sprocket 105 which is releasably mounted on a hub 106 keyed to the spindle 70 by means of a key 107 immediately above the self-aligning bearing 72. A drive chain 108 drivingly connects the driven sprocket 105 to the drive sprocket 104 for rotating the spindle 70.

Figure 1:
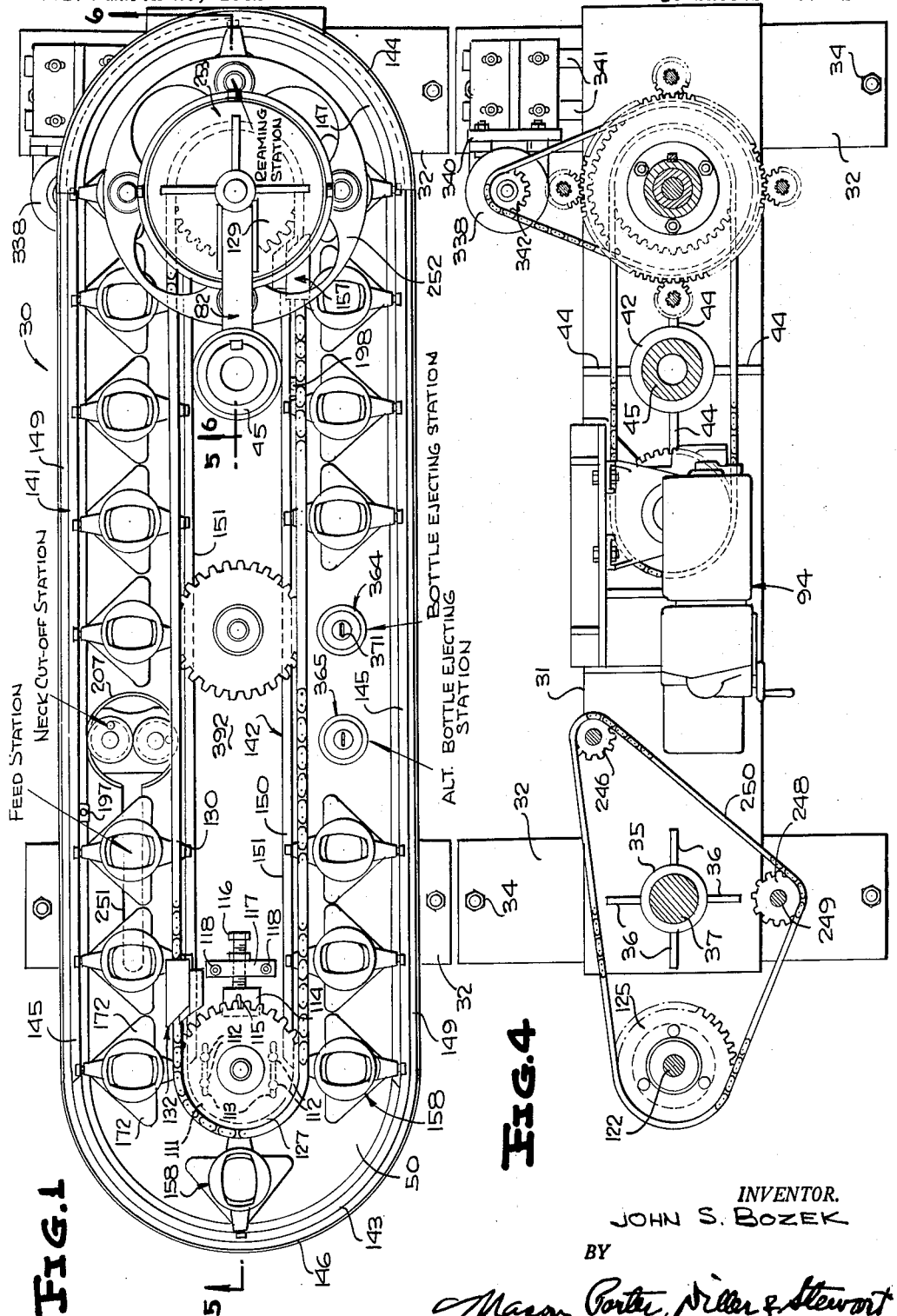
FIGURE 1 is a plan view of the plastic bottle neck reaming machine with the details of the bottle feeding mechanism being omitted and shows the general relationship of the various components thereof.

The table 50 is provided with a centrally located opening 109 to the left of the column 37. A reinforcing plate 110 overlies and is secured to the table 50 around the opening 109 with the plate 110 having a like opening therethrough. A block 111 is seated on the plate 110 for longitudinal sliding movement and, as is best shown in FIGURE 1, is adjustably clamped to the plate 110 by means of fasteners 112 passing through elongated slots 113 in the block 111. An adjusting block 114 is secured to the right side of the block 111, as viewed in FIGURE 1. The adjusting block 114 is provided with a longitudinal slot 115 in which a hold-down bolt (not shown) is positioned. An adjusting screw 116 engages the adjusting block 114 and is threadably engaged in an elongated neck member 117 which is secured to the plate 110 by means of fasteners 118.

Referring once again to FIGURE 5 in particular, it will be seen that the block 111 carries an elongated bearing sleeve 120 which is vertically disposed and extends through the block 111 so that portions thereof are disposed below and above the table 50. The bearings 121 are positioned at opposite ends of the bearing sleeve 120 and rotatably support a shaft 122. A hub 123 is removably secured in the lower end of the shaft 122 by means of a nut 124. The hub 123 carries a sprocket 125 which is releasably secured to the hub 123 by securing means including a bolt 126. Another sprocket 127 is secured on the upper end of the shaft 122 by means of a key 128.

A sprocket 129 is carried by the upper portion 93 of the spindle 70 in horizontal alignment with the sprocket 127. The sprocket 129 is disposed immediately above, slightly spaced from, the bearing sleeve 78. An endless conveyor chain 130 is entrained over the sprockets 127 and 129 for movement within a horizontal plane. In order to accomplish the movement of the endless conveyor chain 130, the sprocket 129 is secured to the spindle 70 for rotation therewith by means of a key 131.

At this time, it is pointed out that as the endless conveyor chain 130, which moves in a clockwise direction in FIGURE 1, moves off of the sprocket 127, it is desirable to guide the chain 130. To this end, there is provided a chain guide unit which is best illustrated in FIGURES 1 and 12, the chain guide unit being generally referred to by the numeral 132. The chain guide unit 132 includes an upstanding support 133 which is mounted in a manner to be described in detail hereinafter. It is to be noted that the conveyor chain 130 is of the double row type and accordingly, a first guide element 134 is secured to the upper part of the support 133 and projects outwardly therefrom for engaging the individual rollers 135 of the chain 130. The central portion of the guide element 134 is recessed, as at 136, so as to provide clearance for the center plates 137 of the chain 130. A generally hook-shaped guide element 138 overlies the guide element 134 and extends outwardly therefrom. The guide element 138 is provided with a downwardly facing, generally C-shaped recess 140 in the underside thereof for receiving and guiding the upper portion of the chain 130.

Referring now to FIGURE 1 in particular, it will be seen that the table 50 carries an outer track structure, generally referred to by the numeral 141, and an inner track structure, generally referred to by the numeral 142, the track structures 141 and 142 being disposed concentric with respect to the endless conveyor chain 130 and with the inner track 142 being disposed inwardly of the chain 130.

The outer track 141 includes a semi-circular section 143 disposed at the left end of the table 50 and a second semi-circular portion 144 disposed at the right end of the table 50. Straight track sections 145 join the ends of the track portions 143 and 144. As is clearly shown in FIGURES 1 and 5, the semi-circular track portion 143 is mounted on a similarly shaped plate 146, which, in turn, is suitably secured to the table 50. In FIGURE 6, it is shown that the track portion 144 is mounted on a semi-circular plate 147 which is suitably mounted on the table 50. The track portion 144, instead of being rails as are the track portion 143 and the track sections 145, is in the form of a guide member and is provided with an inwardly facing guideway 148. The track sections 145, as is best illustrated in FIGURE 7, are mounted on elongated strips 149 which are suitably secured to the table 50.

The inner track 142 is formed in part by a pair of elongated rails 150 which are mounted on elongated strips 151 which are suitably secured to the table 50. The left ends of the rails 150 are notched into the block 111 and the block 111 forms a continuation of the rails 150 and thus a portion of the track 142.

Reference is now made to FIGURE 6 in particular, wherein it will be seen that the bearing sleeve 78 has secured to the right portion thereof, as viewed in FIGURE 6, an arcuate in plan support 152. A semi-circular track portion 153 is supported by the support 152 and is secured thereto by means of suitable fasteners 154. It is to be noted that the track portion 153 is more in the form of a guide and is provided with an outwardly facing guideway 155.

Reference is now once again made to FIGURE 12, wherein it will be seen that the support 133 is carried by the track section or rail 150. The support 133 is secured to the rail 150 by means of a plurality of fasteners, of which only one is shown, the fasteners being referred to by the numeral 156. A second chain guide, generally referred to by the numeral 157, is associated with the conveyor chain 130. The second chain guide 157 is of an identical construction to the chain guide 132 and is secured to the other of the rails 150 in diagonally opposite relation. As is clearly shown in FIGURE 1, the chain guide 157 is positioned for engaging the chain 130 as it passes off of the sprocket 129.

As is clearly shown in FIGURE 1, a plurality of bottle holders, each generally referred to by the numeral 158, is carried by the conveyor chain 130 for movement therewith and are supported by the tracks 141 and 142. Each of the bottle holders 158 includes a generally cylindrical sleeve portion 160 having a bottom wall 161 and defining an internal socket 162. A pair of diametrically opposite arms 163, 164 are integrally connected to the sleeve 160. The arms 163 and 164 are tubular and support rollers 165 and 166, respectively. As is clearly shown in FIGURE 18, the roller 166 is provided with a stub axle 167 which is threaded within its associated arm 164. The roller 165 is mounted in a like manner.

The bottle holders 158 are secured to the conveyor chain 130 by means of mounting blocks 168. Each mounting block 168 receives a pair of depending pins 169 on the conveyor chain 130 and is secured to the sleeve 160 by means of fasteners 170. It is to be noted that the roller 165 of each bottle holder 158 rolls on the track 141 while the roller 166 of each bottle holder 158 rolls on the track 142. Each bottle holder 158 includes a removable insert 171 which is seated in the sleeve 160 whereby the bottle holders 158 may be readily adapted for bottles of different sizes and configurations.

Each of the holders 158 is also provided with a pair of ears 172 which, when the holders 158 are moving longitudinally of the machine 30, are in longitudinal alignment, but offset inwardly from the centers of the holders 158. Each of the ears 172, as is best shown in FIGURE 10, is provided with an outer boss portion 173 having a bore 174 therethrough. Each boss portion 173 carries an aligning sleeve 175 with a bore 176 therethrough. Each aligning sleeve 175 is provided with an upper enlargement 177 which is seated on its respective boss 173 and is locked in place by a locking ring 178 which underlies the respective ear 172. The purpose of the aligning sleeves 175 will be described in detail hereinafter.

Figure 18:
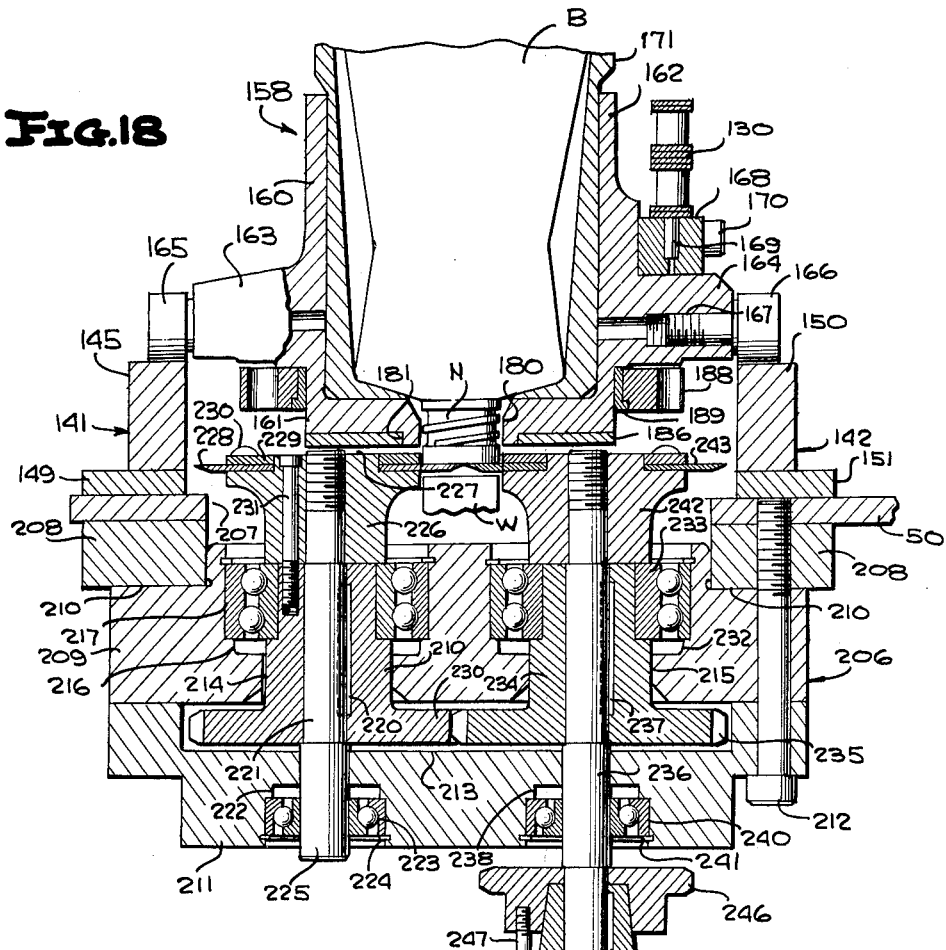
FIGURE 18 is an enlarged fragmentary transverse vertical sectional view taken along the line 18—18 of FIGURE 5 and shows the specific details of the cutter mechanism for removing the extensions on the neck of a bottle carried by one of the bottle holders.

In FIGURE 18, the bottle holder 158 illustrated therein is illustrated with a bottle B which is to be operated on in accordance with this invention, seated therein. The bottle B is inverted and has a then lowermost disposed neck N which is externally threaded, and a waste portion W in the form of an extension of the neck N which must be removed. The bottom 161 of the bottle holder 158 is provided with a centrally located bore 180 receiving the neck N of the bottle B. The bottom 161 is provided with a boss 181 on the underside thereof surrounding the bore 180.

Figure 19:
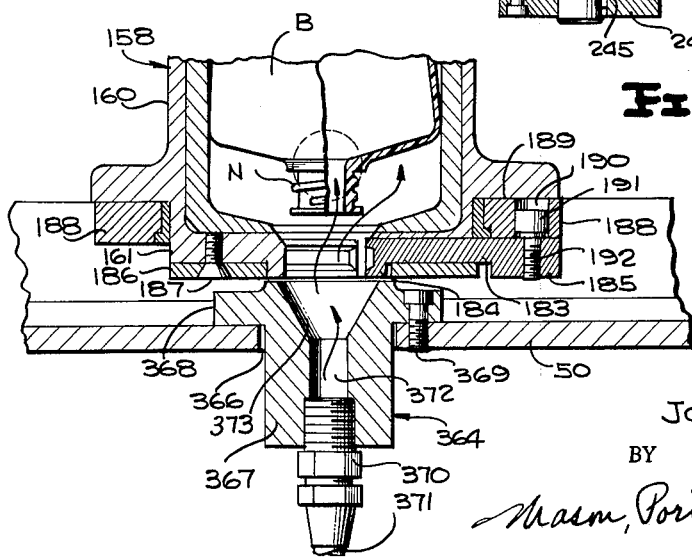
FIGURE 19 is an enlarged fragmentary vertical sectional view taken along the line 19—19 of FIGURE 7 and shows the manner in which an air blast is utilized to remove a bottle from a bottle holder.

Each of the bottle holders is provided with a neck clamp on the underside thereof, the neck clamp being generally referred to by the numeral 182. As is best shown in FIGURE 15, the bottom 161 of the individual bottle holder 158 is provided with three radiating recesses 179 formed in the underside thereof. The recesses 179 open into the bore 180 and have disposed therein for radial sliding movement clamp arms 183. The inner ends of the clamp arms are provided with arcuate neck engaging flanges 184 which are internally configured to interlock with the threads of the neck N of a plastic bottle to fixedly secure the neck N of a bottle within the bore 180. The flanges 184 are in effect clamp jaws and will be so referred to hereinafter. The outer ends of the clamp arms 183, as is best shown in FIGURE 19, have a depending portion 185 so as to be of substantially the same thickness as the clamp jaws 184. The clamp arms 183 are retained within the recesses 179 by means of a plate 186 which is annular in outline and which surrounds the boss 181. The plate 186 is secured to the bottom 161 of the bottle holder 158 by means of suitable fasteners 187.

The neck clamp 182 also includes a cam member 188. The cam member 188 is carried for rotation by means of a bushing 189 which is pressed on the lower portion of the sleeve 160 of each bottle holder 158. As is best shown in FIGURE 11, the cam member 188 is provided with circumferentially spaced cam slots 190 therein. Each of the cam slots 190 receives a head 191 of a fastener 192 carried by the outer end of an associated clamp arm 183. Thus, when the cam member 188 is rotated around the bushing 189, the cam slots 190 will effect the outward or inward movement of the head 191 of the fasteners 192 in accordance with the direction of rotation of the cam member 188. In this manner, the clamp jaws 184 are retracted or projected, as is required for the particular operation.

In order to effect the automatic rotation of the cam member 188 of each of the bottle holders 158, the peripheral surface of each cam member 188 is provided with recesses 193 and 194 which define shoulders 195 and 196, respectively.

Reference is now made to FIGURE 1 wherein it will be seen that the machine 30 includes a locking dog 197 and a releasing dog 198. The dogs 197 and 198 are each mounted on a block 200, as is shown in FIGURES 14 and 15, with the block 200 being positioned adjacent a respective one of the rails 145 and 150. In FIGURES 14 and 15, the illustrated dog is the locking dog 197. The block 200 illustrated in FIGURES 14 and 15 is positioned adjacent one of the rails 145 and is secured in place by means of fasteners 201. It will be apparent from FIGURES 14 and 15 that as a bottle holder moves to the right in these figures, the shoulder 195 of the cam member 188 will engage the locking dog 197 and cause rotation of the cam member 188 in a counterclockwise direction, thus forcing the clamp arms 183 inwardly with the result that the clamp jaws 184 will tightly clamp about the neck N of an associated bottle. It is also to be understood that when the cam member 188 approaches the releasing dog 198, the shoulder 196 of the cam member 188 will engage the releasing dog 198 to effect the rotation of the cam member 188 in a clockwise direction and effect the movement of the clamp jaws 184 to neck releasing positions.

Figure 2:
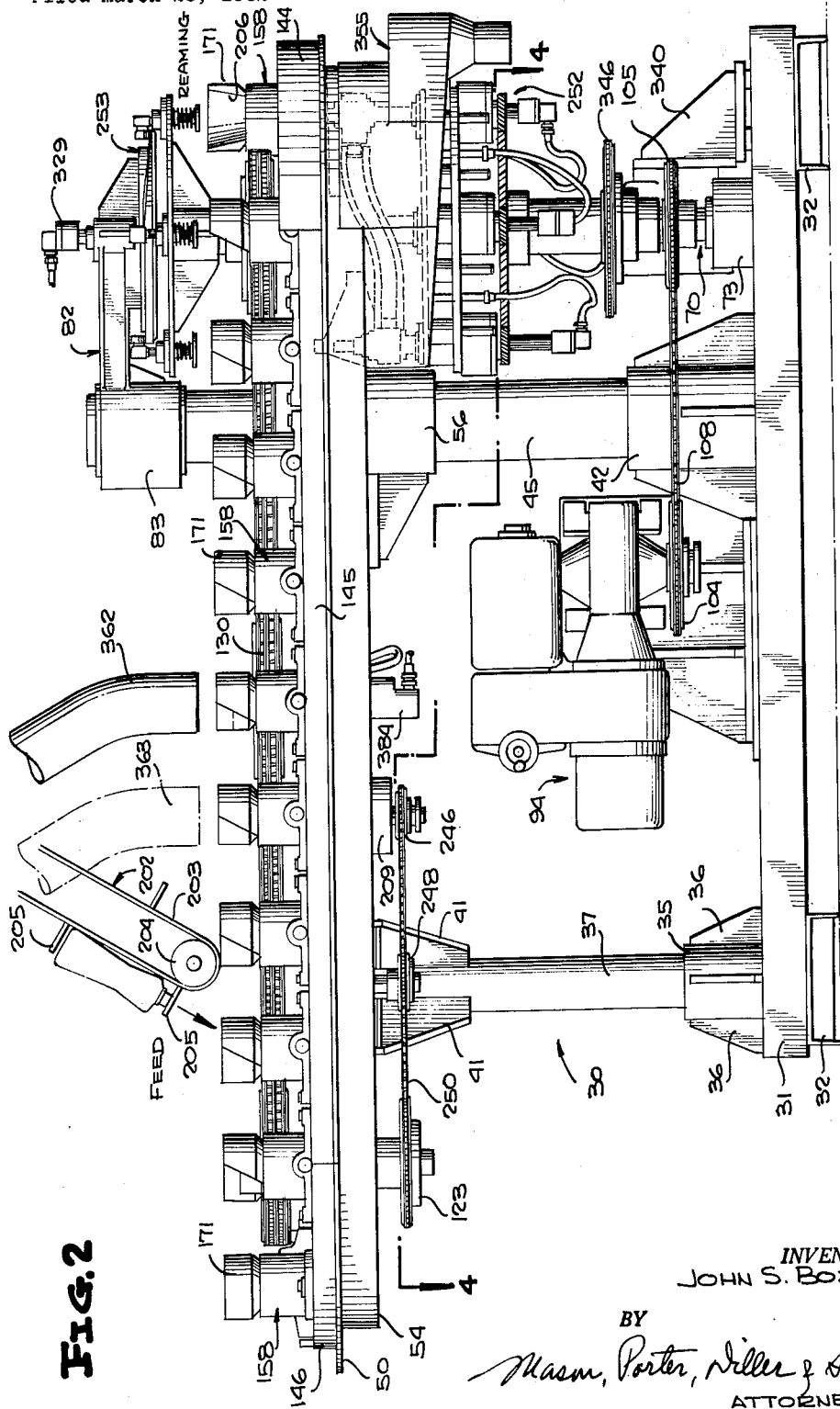
FIGURE 2 is a side elevational view of the machine of FIGURE 1, including the general details of the means for feeding bottles thereto and the means for removing bottles therefrom, and shows further the details of the machine.

Reference is now made to FIGURE 2, wherein it will be seen that a bottle feed unit 202 is illustrated. This form of bottle feed unit includes an endless conveyor belt 203 which is suitably mounted and driven, and with the mounting units including a lower pulley 204. The endless conveyor belt 203 carries a plurality of bottle supports 205 which are spaced therealong and which support bottles B in their descent towards the bottle holders 158. It is to be understood that the rate of movement of the conveyor belt 203 is timed with respect to the rate of movement of the bottle holders 158 so that each bottle is delivered to a bottle holder 158 as it passes beneath the conveyor 203. Incidentally, when the bottle feed assembly 202 is utilized, the front portion of each bottle holder 158 is cut out, as at 206, to facilitate the entry of a bottle thereinto. However, when other types of bottle feed means, as will be described in detail hereinafter, are utilized, it will not be necessary to remove the forward portions of the bottle holders 158.

Reference is now made to FIGURE 18 in particular, wherein there are illustrated the details of the trimming apparatus for removing the waste W of a plastic bottle in accordance with this invention, the trimming apparatus being generally referred to by the numeral 206. The table 50 is provided with an opening 207 along the path of movement of the bottle holders 158 in spaced relation from the feed station and what may be considered a neck cut-off station, as is labeled in FIGURE 1. Also, portions of the strips 149 and 151 are removed to provide clearance.

Suitable mounting bars 208 are secured to the underside of the table 50 alongside the opening 207. A bearing block 209 is clamped against the undersides of the bars 208, with the bearing block 209 having outer recesses 210 in the upper surface thereof for receiving the block 209 and thus transversely aligning the bearing block 209. A lower cover plate 211 is clamped to the underside of the bearing block 209 by fasteners 212 which also serve to mount the bearing block 209 on the bars 208. The cover 211 is provided with an upper recess 213.

The bearing block 209 is provided with a pair of bores 214 and 215 therethrough. The bore 214 has an enlarged upper portion 216 in which a bearing 217 is suitably secured. The bearing 217 has rotatably journaled therein a hub 218 of a gear 220. A shaft 221 extends through the hub 218 and is secured to the hub 218 by means of a longitudinal key 219.

The cover 211 is provided with a lower bearing recess 222 in which a bearing 223 of the thrust type is mounted. The bearing 223 is retained in the cover 211 by means of a retaining ring 224. The shaft 221 has a lower journal portion 225 receiving the bearing 223, with the bearing 223 cooperating with the bearing 217 to effect the mounting of the shaft 221 and the hub 218 for rotation.

A hub 226 is threadedly mounted on the upper end of the shaft 221 above the hub 218. The hub 226 is provided with an upper centrally located boss 227 about which is received a circular cutter blade or knife 228. The cutter blade or knife 228 is clamped on the hub 226 by means of a ring 229 which is secured in place by means of suitable fasteners 230. The hub 226 is locked to the hub 218 for rotation therewith by means of at least one fastener 231.

The bore 215 has the upper portion thereof enlarged to define a bearing recess 232 in which a bearing 233 is seated. The bearing 233 is carried by a hub 234 which is identical with the hub 218 and which is provided at the lower end thereof with a gear 235 which is meshed with the gear 220. A shaft 236 passes through the hub 234 and is secured thereto by means of a key 237.

The cover 211 is provided with a second bearing recess 238 in the underside thereof and in which there is positioned a second thrust bearing 240 which corresponds to the thrust bearing 223. The thrust bearing 240 is locked in the bearing recess 238 by means of a retaining ring 241. The shaft 236 is rotatably journaled in the bearing 240 and projects downwardly therebelow. The bearing 240 cooperates with the bearing 233 to support the shaft 236 and the hub 234 for rotation.

The upper end of the shaft 236 supports a hub 242 which is identical with the hub 226 and which carries a second rotary blade or knife 243 in the same manner as the hub 226 supports the knife 228. It is to be understood that the hub 242 is not only threaded onto the shaft 236, but is secured to the hub 234 for rotation therewith. It is to be noted that the knives 228 and 243 meet and slightly overlap along the line of movement of the bottle holders 158.

That portion of the shaft 236 which projects through and below the cover 211 is provided with a hub 244 which is secured to the shaft 236 by means of a key 245. A sprocket 246 is carried by the hub 244 and is secured thereto by suitable fastening means, including the bolts 247 illustrated in FIGURE 18.

Reference is now made to FIGURE 5 in particular, wherein it will be seen that the sprocket 246 lies in the same horizontal plane as the aforementioned sprocket 125. In addition to the sprockets 125 and 246, an idler sprocket 248 lies in this horizontal plane. The idler sprocket 248 is suitably carried by a stub shaft 249 which depends from the underside of the table 50 and is suitably secured thereto in any desired manner. The drive chain 250 is entrained over the sprockets 125, 246 and 248. It is to be understood that the sprocket 125 is driven through shaft 122 which, in turn, is driven by the sprocket 127 from the conveyor chain 130. Since the sprocket 246 is of a much smaller size than the sprocket 125, it will be seen that the sprocket 246 is rotated at a high rate so that the knives 228 and 243 are rotated at the necessary high rate to effect the cutting of the waste portion W from the neck N of the plastic bottle B as it passes through the neck cut-off station.

With particular reference to FIGURE 1, it is pointed out that in addition to the opening 207 formed in the table 50, an elongated slot 251 is formed in the table 50 in advance of the opening 207 and opening into the opening 207. The slot 251 provides clearance for the waste portion W of each plastic bottle and is not required after the waste portion has been removed therefrom in that the knives 228 and 243 are disposed above the plane of the table 50.

Referring now to FIGURE 6 in detail, it will be seen that the machine 30 includes a bottle neck reaming mechanism, generally referred to by the numeral 252, which is mounted on the spindle 70 for rotation therewith. Associated with the bottle neck reaming mechanism is a bottle hold-down mechanism, generally referred to by the numeral 253, and carried by the spindle 70 for rotation therewith. The bottle hold-down mechanism 253 will be described first.

The bottle hold-down mechanism 253 includes a sleeve 254 which is mounted on the upper portion 93 of the spindle 70 and secured thereto by means of a key 255 for rotation therewith. The sleeve 254 has the lower end thereof abutting against the hub of the sprocket 129. A thrust bearing 256 is disposed between the upper end of the sleeve 254 and the lower end of the bearing sleeve 91.

A hold-down plate 257 is carried by the upper portion of the sleeve 254 for rotation therewith. The hold-down plate 257 is braced relative to the sleeve 254 by means of gussets or braces 258. The hold-down plate 257 is also provided with large openings 260 which are primarily lightening openings.

Reference is now made to FIGURE 9 wherein it is shown that the hold-down plate 257 is provided with an opening 261 in the outer portion thereof. There are a plurality of such openings 261 with the openings being spaced circumferentially about the hold-down table or plate 257 in accordance with the spacing of the bottle holders 158 as they pass around the axis of the spindle 70. An internally splined bushing 262 partially projects through each of the openings 261 and is secured to the hold-down plate 257 by means of fasteners 263. A splined shaft 264 is slidably mounted within the bushing 262 and has a bottle engaging foot 265 threaded on the lower end thereof. A spring 266 is telescoped over the lower portion of the bushing 262 and an upper portion of the foot 265 to normally urge the foot 265 downwardly so it may clamp against the bottom of a plastic bottle B and retain the same within its associated bottle holder 158 against upward movement during a neck reaming operation.

Referring once again to FIGURE 6 in particular, it will be seen that a plate 267 is carried by the lower portion of the bearing sleeve 91 in overlying relation to the hold-down plate 257. The plate 267 is braced from the bearing sleeve 91 by means of a gusset or brace 268.

As is best shown in FIGURE 9, the lower peripheral portion of the plate 267 is provided with a recess 269 in which there is seated a cam 270. The cam 270 is secured to the plate 267 by means of fasteners 271.

Each of the shafts 264 is provided with an enlarged upper end 272 in which there is mounted a stub axle 273 of a cam follower 274. The cam follower 274 rides on the upper surface of the cam 270 and controls the downward movement of the shaft 264 and the foot 265 due to the urging of the spring 266. It is to be understood that the cam 270 is stationary and is so shaped whereby the feet 265 are lowered after bottles are positioned therebeneath and are raised immediately prior to the movement of the bottles from beneath the feet 265.

Referring once again to FIGURE 6 in particular, it will be seen that the bottle neck reaming mechanism 252 includes a hub 275 which is mounted on a central portion of the spindle 70 and is secured thereto by means of a key 276 for rotation therewith. The opposite ends of the hub 275 are recessed and receive central portions of a pair of parallel plates 277 and 278.

The outer portions of the plates 277 and 278 are spaced apart by means of circumferentially spaced bearing sleeves 280 which have reduced end portions seated in the plates 277 and 278. The plates 277 and 278 are clamped together in any suitable manner; or, may be welded to the hub 275 and bearing sleeves 280.

Each of the bearing sleeves or bearing holders 280 has a bushing type bearing 281 mounted in the upper portion thereof. Each bearing 281 receives a smooth surfaced intermediate portion of a vertical shaft 282 which passes down through the bearing sleeve 280. The shaft, which is referred to by the numeral 283, has a splined lower portion 284.

A bearing block 285 is secured to the underside of the plate 278 in alignment with each of the bearing sleeves 280. The bearing block 285 carries a bearing 286 which is held in the lower portion of the bearing block 285 by means of a cover 287 which is secured in place by means of suitable fasteners 288. An internally splined hub 289 of a gear 290 is rotatably journaled in the bearing 286. The hub 289 is splined onto the splined portion 284 of the shaft 283 and is fixed against vertical movement relative to the bearing 286 by means of a retaining ring 290. An oil retainer 291 is mounted in the bearing block 285 above the bearing 286.

Figure 3:
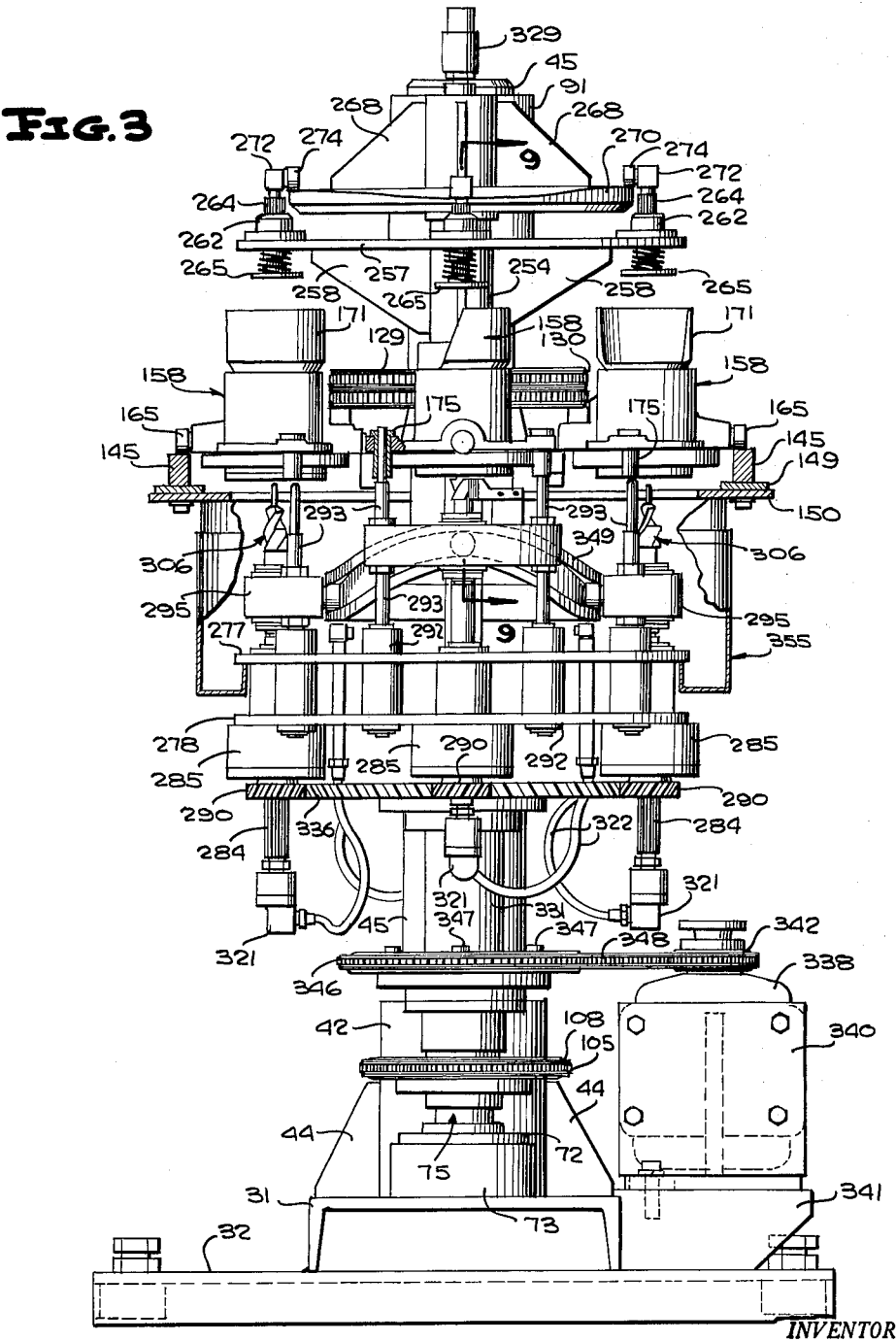
FIGURE 3 is an elevational view of the machine of FIGURE 1 looking from the right end thereof, with a portion of the housing of the machine being broken away and shown in section in order to illustrate the specific details of the neck reaming mechanism.

Reference is now made to FIGURE 3 in particular wherein it will be seen that for each of the shafts 283, the plates 277 and 278 carry a pair of sleeves 292 which have guide rods 293 extending upwardly therefrom. It is to be understood that the guide rods 293 are slidable through the sleeves 292.

Referring now to FIGURE 10 in particular, it will be seen that upper central portions of the guide rods 293 are threaded, as at 294, and receive plates 295, each pair of guide rods 293 supporting a plate 295. The plate 295 is adjusted relative to the guide rods 293 by means of clamp nuts 296 on the threaded portions 294 above and below the plate 295. As is best shown in FIGURE 8, each plate 295 is of a shallow, generally triangular outline.

Each plate 295 is provided with a centrally located opening 297 through which a threaded upper portion 298 of the shaft 283 passes. The bore 297 has at its opposite ends enlarged bearing receiving recesses 300 in which bearings 301 are seated. The bearings 301 are of the thrust type and have received therethrough the threaded upper portions 298 of the associated shaft 283. Thrust washers 302 engage against the bearings 301 and are held in place by nuts 303 threaded on the threaded portion 298 of the shaft 283.

The extreme upper end of the shaft 283 is provided with an elongated bore 304 in which there is mounted a stem 305 of a tool, generally referred to by the numeral 306. The tool 306 is removably carried by the shaft 283 and the stem 305 is held in the bore 304 by means of a setscrew 307.

The tool 306 includes a base 308 from which the stem 305 depends. The upper end of the base 308 is machined, to define an end mill 309. The tool 306 is reduced above the base 308 and is circumferentially configurated to define a reamer 310 which is shaped to feed cuttings or shavings downwardly, as is shown in FIGURE 10. The extreme upper end of the tool 306 is in the form of a tube 311 having a closed upper end 312. The tube 311 is provided with radiating openings 313 through which air may pass and enter into the bottle B being worked upon.

It is to be understood that in the operation of the machine 30, the shafts 283 will be rotated with the result that the tools 306 carried thereby will also be rotated. During the resultant reaming operation on the neck N of a bottle, long shavings and cuttings may result. These are undesirable in that they may jam portions of the machine 30, and it is therefore desirable to break the shavings or cuttings into chips. To this end, a cutting breaker 314 is provided, the cutting breaker, as is best shown in FIGURE 11, being of a generally L-shaped configuration and having a tapered cutting edge 315. The cutting breaker 314 is secured to a mounting block 316 by means of fasteners 317. Each mounting block 316 is suitably mounted on an associated one of the plates 295.

It is to be noted that each shaft 283 has an air passage 318 therethrough. In a like manner, each tool 306 has an air passage 320 therethrough which is in communication with the air passage 318 of an associated shaft 283 when the tool 306 is mounted in the end of the shaft.

A swivel fitting 321 is connected to the lower end of each of the shafts 283 for supplying air into the bore 318 therein. A flexible hose 322 is connected at one end to a respective one of the swivel fittings 321 and at the opposite end to a tube 323 which is rigidly supported by either one or both of the plates 277 and 278. An elbow 324 is connected to the upper end of the pipe 323, and a pipe 325 extends from the elbow 324 to a fitting 326 which is threaded into a radiating bore 327 in the spindle 70. The spindle 70 has the upper portion thereof provided with a central air passage 328 therethrough, and a swivel fitting 329 is connected to the upper end of the spindle 70. A fitting 330 is carried by the swivel fitting 329 and is adapted to be connected to a source of compressed air whereby compressed air may be supplied to the individual tools 306.

It is obvious that the tools 306 must be rotated to be effective. Accordingly, it is necessary to rotate the shafts 283. The drive mechanism for the shafts 283 includes a sleeve 331 which is mounted on the spindle 70 below the hub 275. The sleeve 331 is provided at the opposite ends thereof with bearings 332 to permit the free rotation thereof about the spindle 70.

The sleeve 331 has a reduced upper portion defining a shoulder 333. A hub 334 is telescoped around the reduced upper portion of the sleeve 331 and is seated on the shoulder 333. A key 335 is used to drivingly connect the sleeve 331 to the hub 334.

Figure 17:
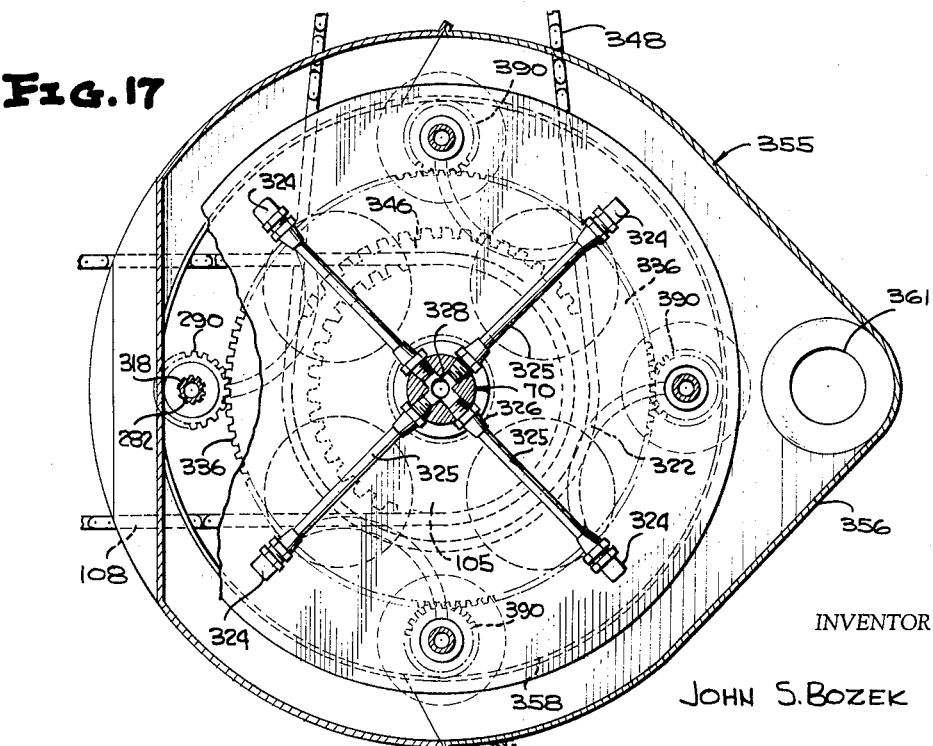
FIGURE 17 is a horizontal sectional view taken along the line 17—17 of FIGURE 6, and shows the specific details of the means for supplying air to the interiors of the individual tool holding spindles of the neck reaming mechanism.

A large gear 336 is carried by the hub 334 and is secured thereto by a plurality of fasteners 337. The gear 336 is meshed with the smaller gears 290 carried by the shafts 283. As is clearly shown in FIGURE 17, the diameter of the gear 336 is such that it clears the pipes 323, although this is not apparent from FIGURE 6.

In order to drive the sleeve 331, a drive motor 338 is provided, as is best shown in FIGURES 3 and 4. The drive motor 338 is mounted on a motor support bracket 340 which, in turn, is adjustably mounted on a support 341 carried by the right hand one of the feet 32. The motor 338 is provided with a sprocket 342.

Referring once again to FIGURE 6 in particular, it will be seen that a hub 343 is mounted on the lower portion of the sleeve 331. The hub 343 is connected to the sleeve 331 for rotation therewith by means of a key 344. A retaining ring 345 is carried by the sleeve 331 and underlies the hub 343 to prevent downward movement thereof. A sprocket 346 is secured to the hub 343 by means of suitable fasteners 347. The sprocket 346 lies in the same horizontal plane with the sprocket 342 and is connected thereto by means of a drive chain 348. At this time, it is pointed out that the drive for the shafts 283 is such that the shafts 283 and the tools 306 carried thereby rotate at a relatively high speed.

In the operation of the machine 30, it is necessary that the shafts 283 and the tools 306 carried thereby be vertically reciprocated in timed relation to the movement of the bottle holders 158 thereover. In order to accomplish this, a cam 349 is provided. The cam 349 is carried by a mounting plate 350 which is secured to the underside of the bearing sleeve 78 and the plate 76. The cam 349 is releasably secured to the plate 350 by means of fasteners 351.

It is to be noted that the cam 349 is provided with a peripheral guideway 352 in which followers 353 are positioned. The followers 353, as is best shown in FIGURE 9, are carried by stub axles 354 which are threaded into the plates 295.

It is to be understood that during the neck reaming operation, chips are formed which fall down into the interior of the machine 30. In order to prevent these chips from entering into parts of the machine and from being scattered outside of the machine on the floor, a chip collector 355 is provided. The chip collector 355 is preferably made in two halves, although it will be described as being of a unitary construction. The chip collector 355 includes an outer shield 356 which is secured to the stiffener 54 depending from the table 50. A bottom wall 357 is secured to the lower edge of the outer shield 356 and is supported thereby. An inner shield 358 is carried by the inner edge of the bottom wall 357 and underlies the plate 277. The undersurface of the plate 277 has a groove 360 in which the upper edge of the inner shield 358 is received so as to prevent the passage of chips therebetween. The bottom wall 357 slopes downwardly and to the right, as viewed in FIGURE 6, and is provided with a spout 361 in which chips are collected and through which the chips may be discharged to suitable collecting means. It is to be understood that the chips are re-usable.

Reference is now made to FIGURES 1 and 2 wherein it is shown that the machine 30 has two bottle discharge or ejection stations. In FIGURE 2, it is shown that for one of the ejection stations there is provided a bottle receiving tube 362. A second bottle receiving tube 363 is shown in phantom lines. However, it is to be understood that the machine 30 may be provided with both bottle receiving tubes 362 and 363 at the same time, and that depending upon operating conditions of the machine 30, the bottles which are being reamed may be selectively discharged into either of these two tubes.

In order to effect the discharge of bottles into the tubes 362 and 363, the table 50 is provided with a pair of air ejecting heads 364 and 365 underlying the tubes 362 and 363, respectively. The air ejecting heads 364 and 365 being identical, only the air ejecting head 364 will be described in detail. Reference is made to FIGURE 19 wherein it is shown that the table 50 is provided with an opening 366 therein. The air ejecting head 364 includes a tubular portion 367 which is provided at the upper end thereof with a flange 368. The flange 368 rests upon the upper surface of the table 50 and is secured thereto by means of suitable fasteners 369. A fitting 370 of a compressed air line 371 is threaded in the lower end of the tube 367.

It is to be noted that the tube 367 has an air passage 372 through the lower portion thereof, and that the air passage 372 terminates at its upper end in an upwardly flaring air passage 373. As is clearly shown in FIGURE 1, the air passage 373 is elongated in the direction of bottle holder travel and while it is relatively long in the direction of movement of the bottle holders 158, it is also relatively narrow transversely of this direction of movement.

It is to be understood that compressed air for ejecting bottles B from the bottle holders 158 is not continuously supplied to the air ejecting head 364.

In order to control the flow of compressed air to the air ejecting head 364, the table 50 is provided with an elongated, generally rectangular opening 374 in which there is mounted a valve generally referred to by the numeral 375. The valve 375 includes a valve block 376 which is adjustably secured to a mounting plate 377 which overlies the opening 374 and is fixedly secured to the table 50. It is to be noted that the valve block 376 is provided with longitudinally elongated openings 378 which receive bolts 379, the bolts 379 passing through the valve block 376 and being anchored to the plate 377.

The valve block 376 carries a sleeve or bushing 380 which projects above and below the valve block 376, as is clearly shown in FIGURE 5. The sleeve 380 carries for rotation a valve member 381. The valve member 381 is provided with a vertical bore 382 in the lower portion thereof, and the bore 382 terminates in a plurality of transverse bores 383 which extend radially outwardly through the valve member 381. A swivel fitting 384 is secured to the lower end of the valve member 381 and has connected thereto an air line 385 which, in turn, is connected to a suitable source of compressed air. In order to prevent the escape of compressed air between the valve member 381 and the sleeve 380, the valve member 381 is provided with O-rings 386 above and below the air passages 383.

Figure 16:
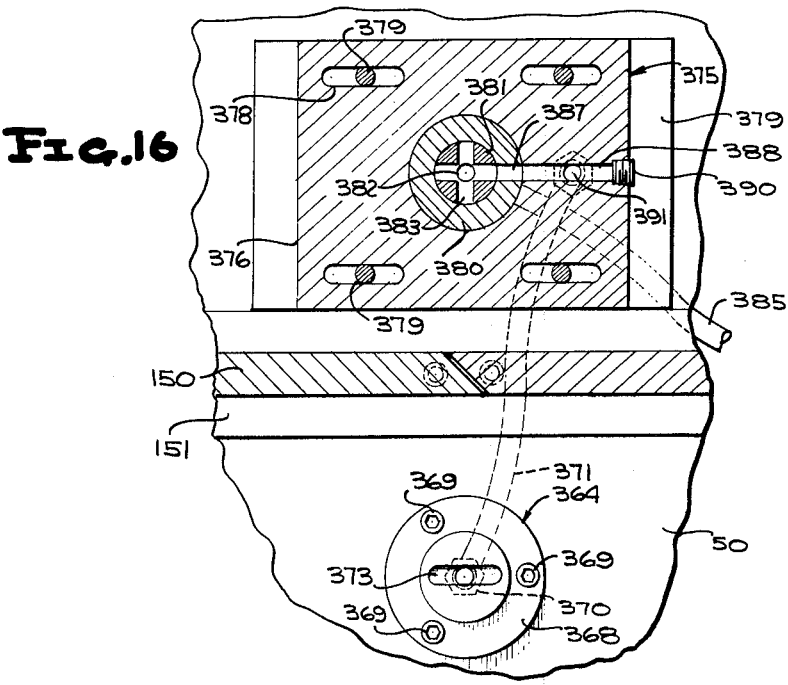
FIGURE 16 is an enlarged fragmentary horizontal sectional view taken along the line 16—16 of FIGURE 5, and shows the specific details of a valve for controlling the automatic ejection of a bottle from an associated one of the holders.

The sleeve 380 is provided with an air passage 387 which, in turn, is aligned with an air passage 388 in the valve housing or block 376. The outer end of the air passage 388 is closed by a plug 390. However, as is shown in FIGURE 5 as well as in FIGURE 16, a vertical air passage 391 intersects the air passage 388 and opens through the lower end of the valve block 376. The air line 371 is coupled to the valve block 376 in communication with the air passage 391.

In order that the valve member 381 may be rotated to effect the timed supplying of compressed air to the air ejecting heads 364 and 365, as desired, a sprocket 392 is carried by an enlarged portion of the valve member 381, which enlarged portion is disposed above the sleeve 380 and rests thereupon to prevent downward movement of the valve member 381. The sprocket 392 is secured to a hub 393 by means of at least one fastener 394. The hub 393 is, in turn, locked to the valve member 381 by means of a setscrew 395.

As is clearly shown in FIGURE 1, the sprocket 392 is disposed intermediate the two runs of the chain 130 and is engaged by both runs of the chain so as to be rotated thereby. This provides the necessary rotation for the valve member 381. The proper timing of the supplying of air to one of the air ejecting heads 364 and 365 can be obtained by longitudinally shifting the valve 375.

It is to be understood that only one of the air ejecting heads 364 and 365 will be used at a time. When it is desired to use the air ejecting head 365, the air line 371 will be disconnected from the air ejecting head 364 and coupled to the air ejecting head 365.

Operation

In the operation of the machine 30, as described above, plastic bottles B direct from a molding machine will be delivered to the machine 30 by means of the bottle feed 202. As one of the bottle holders 158 passes beneath the bottle feed 202, a bottle B will be deposited thereinto in an inverted position. The bottle holder and bottle continue to move longitudinally of the machine 30 in a clockwise direction, as viewed in FIGURE 1, and as the bottle holder continues to move, the cam 188 carried thereby will engage the locking dog 197 which will effect the rotation of the cam 188 to close the clamp jaws 184 to clamp the threaded neck N of the bottle. In this manner, the bottle B is rigidly fixed within its associated holder.

The bottle holder 158 with the bottle B locked therein next delivers the bottle to the neck cut-off station, at which point the waste W projecting from the bottle neck is removed by the rotating knives 228 and 243 in the manner generally shown in FIGURE 18.

After the waste has been removed from the bottle neck, the bottle holder continues to move towards the right end of the machine 30, as viewed in FIGURE 1. As the bottle holder 158 starts to move around the axis of the spindle 70, the bottle B carried thereby moves into position below one of the feet 265. Then, as the bottle holder 158 and its associated bottle B start the arcuate movement at the end of the machine 30, due to the urging of the spring 266 on the associated foot 265 and the shape of the cam 270, the foot 265 moves downwardly and engages the then uppermost bottom of the bottle B to firmly hold the bottle B down in the bottle holder 158 and to prevent upward movement thereof.

As the bottle holder 158 moves around the arcuate portion of its travel at the right end of the machine 30, as viewed in FIGURE 1, simultaneous with the downward movement of the foot 265, the upward movement of an associated one of the plates 295 occurs. In the upward movement of the plates 295, the rods 293 carried thereby have reduced upper end portions thereof entering into the sleeves 175 to effect an alignment of the bottle holder 158 with the plate 295. In this manner, the neck N of the bottle B carried by the bottle holder 158 is aligned with the tool 306 associated with the plate 295. As the bottle holder 158 continues to move around its arcuate path at the right end of the machine 30, further upward movement of the associated plate 295 results in the tube 311 of the tool 306 entering into the bottle B and the supplying of air into the interior of the bottle so that the bottle is internally pressurized prior to the entrance of the reamer 310 into the interior of the neck N. Thus, as the reamer 310 operates to ream the interior of the neck N, any chips formed as a result of the reaming operation are blown back out through the neck of the bottle B and do not enter into the bottle. This, of course, eliminates the problem of removing chips from the interior of the bottle at a later time.

The tool 306 continues to move upwardly with the end mill portion 309 engaging the end of the neck N and surfacing this end. The amount of cut of the end mill 309 is controlled by the height which the tool 306 is elevated.

It is to be understood that the reaming operation takes place when the bottle holder 158 and its associated bottle B is substantially half-way around the arcuate path at the right end of the machine 30, as viewed in FIGURE 1. After the reaming operation has been completed, the associated plate 295 moves downwardly first pulling the tool 306 out of the neck N of the bottle and then completely retracting the rods 293 out of the sleeves 175. As the rods 293 move out of the sleeves 175, the associated foot 265 is elevated to release the bottle B.

Referring once again to FIGURE 1 in particular, it will be seen that after the reaming operation has been completed, the bottle holder 158 starts to move along the other straight portion of its path of movement and the cam 188 engages the releasing dog 198 and is rotated thereby to retract the clamp jaws 184 and thus release the neck N of the bottle B. The bottle is now freely seated in its associated bottle holder 158.

The bottle holder continues its straight line movement and passes over the air ejecting heads 364 and 365. Considering the air ejecting head 364 to be the active one, it will be seen that air is delivered to the air ejecting head 364 in timed relation to the movement of the bottle holder 158 thereover and a blast of compressed air is forced upwardly into the bottom of the bottle holder 158 with the result that the bottle B disposed therein is forced upwardly and out thereof, as is shown in FIGURE 19.

The ejected bottle B then enters into the associated tube 362 and is delivered by air flow in the tube to another station where, if desired, printing may be performed on the bottle, or the bottle may be packaged for shipment.

Reference is now made to FIGURES 20 through 27 wherein a modified form of bottle feed is illustrated. The bottle feed includes a chute 400 of which at least the lower portion is vertically disposed. The chute 400 terminates at its lower end in a tapered dispensing opening 401. The chute 400 is supported in any desired manner, although the lower part thereof is rigidly fixed with respect to the machine 30 in a manner to be described hereinafter. It is to be understood that the chute 400 will be continuously supplied with bottles so that bottles will be available at all times.

A bottle releasing mechanism, generally referred to by the numeral 402, is associated with the lower portion of the chute 400 to release one bottle at a time. The bottle releasing mechanism 402 is supported from the table 50 of the machine 30 with the support means including a plate 403 secured to the outer surface of the rail 145 by means of suitable fasteners 404. A second plate 405 is secured to the inner surface of one of the rails 150 by means of suitable fasteners 406. It is to be noted that the plates 403 and 405 are transversely aligned and are mounted on the machine 30 along what may be considered the return portion of the path of the bottle holders 158 and adjacent the left end of the machine 30. At this time, it is pointed out that the chute 400 is disposed in centered relation along the radial line extending between the intersection of the straight run and the arcuate run of the path of movement of the bottle holders 158. A pair of channel members 407 extend upwardly from the plate 403, and are secured thereto by means of suitable fasteners 408. It is to be noted that the supports 407 are generally Z-shaped in outline, as is shown in FIGURE 22. An upstanding support 409 is secured to the plate 405 by bolts 410.

The upper ends of the supports 407 lie in spaced apart vertical planes. A pair of transversely spaced plates 411 are disposed between the upper ends of the supports 407 and 409 and are clamped together in spaced relation by means of suitable spacers 412 and bolts 413. Certain of the bolts 413 are utilized to secure the upper ends of the supports 407 and 409 to the plates 411. Spacers 414 are disposed between the upper ends of the supports 407 and 409 and the plates 411.

Figure 20:
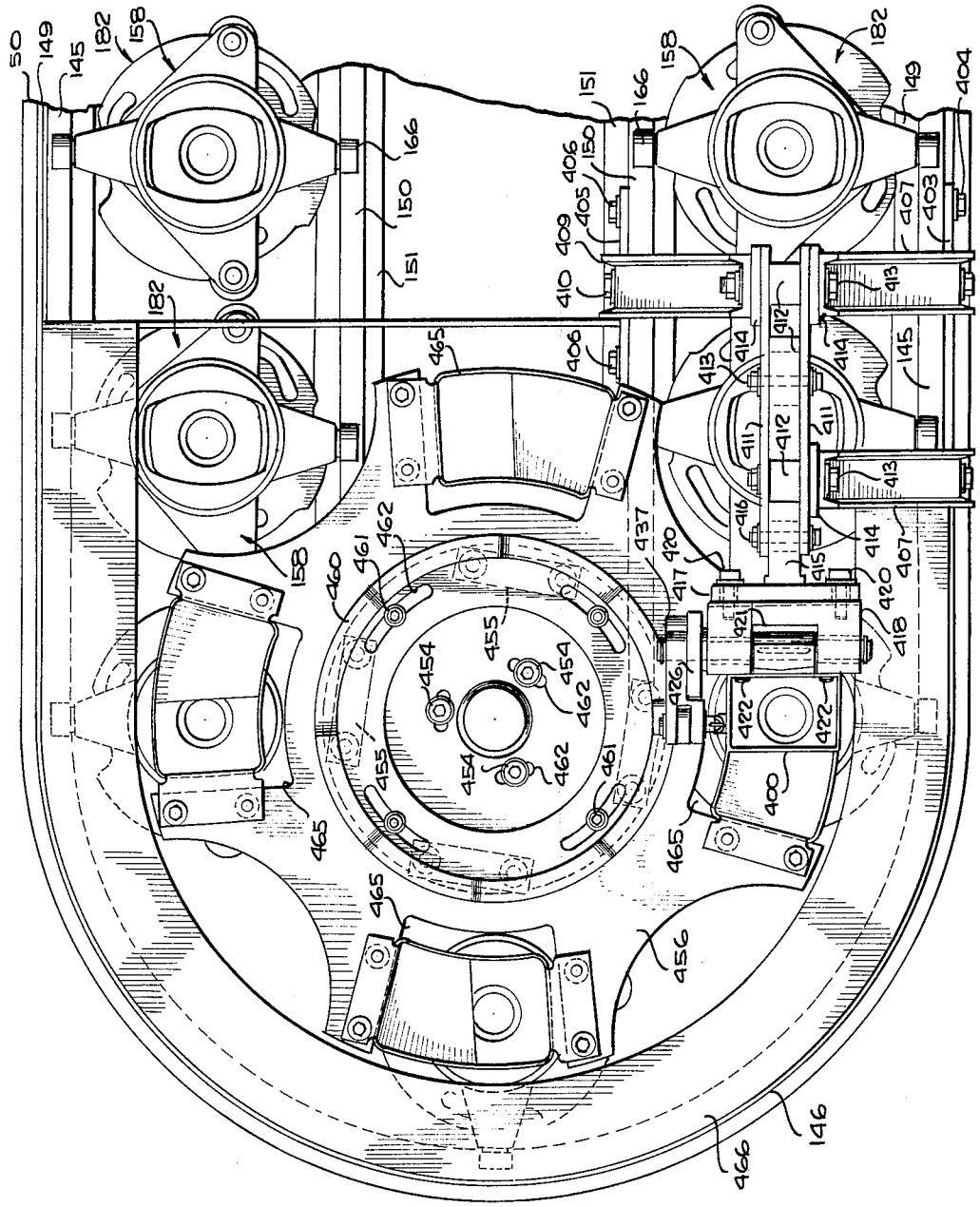
FIGURE 20 is an enlarged fragmentary plan view of the left end of the machine of FIGURE 1 with the machine being provided with a modified form of bottle feed.

A supporting ear 415 projects to the left from between the two plates 411 and is vertically adjustably secured thereto by bolts 416. A mounting plate 417 is rigidly carried by the supporting ear 415. A channel-shaped block 418 is releasably secured to the plate 417 by means of bolts 420. As is best shown in FIGURE 20, the channel-shaped block 418 opens towards the chute 400 and the opening therein is referred to by the numeral 421. The lower end of the chute 400 is supported by the block 418 by means of fasteners 422.

Referring now to FIGURE 24 in particular, it will be seen that the block 418 has bushings 423 seated therein in transverse alignment and on opposite sides of the opening 421. A shaft 424 extends across the opening 421 and is rotatably journaled in the bushings 423. One end of the shaft 424 projects only a short distance through the block 418 and is retained against inward movement by means of a locking ring 425. The opposite end of the shaft 424 projects a considerable distance outwardly of the block 418 and has a hub 426 secured thereon by means of a key 427. A spacing washer 428 is disposed intermediate the hub 426 and the block 418, and the hub 426 is retained on the shaft 424 by means of a locking ring 429.

The shaft 424 carries a bottle holding lever 430. The lever 430 includes a hub 431 which is received on the shaft 424 within the opening 421 and is secured to the shaft 424 for movement therewith by means of a key 432. The lever 430 is provided with an upper bottle retaining finger 433 and a lower bottle retaining finger 434. Openings 435 and 436 are formed in the chute 400 for receiving the fingers 433 and 434, respectively.

An arm 437 is carried by the hub 426 for angular adjustment, the arm 437 being secured to the hub 426 by bolts 438 which pass through arcuate slots 440 in the arm 437.

As is clearly shown in FIGURE 20, the end of the arm 437 remote from the hub 426 is bifurcated and has received therein the upper end of a bar 441. The bar 441 is pivotally connected to the arm 437 by means of a pin 442 which is locked in place by retaining rings 443.

A parallel arm 444 is connected to an intermediate portion of the bar 441 by means of a pin 445 for pivotal movement. The pin 445 is retained in place by a retaining ring 446. Like the arm 437, the outer end of the arm 444 is also bifurcated, as is best shown in FIGURE 24. The bar 441 is provided with a clearance notch 447 to clear the arm 444.

Referring once again to FIGURE 24 in particular, it will be seen that the block 418 has a pin 448 projecting outwardly therefrom parallel to the shaft 424. The end of the arm 444 remote from the bar 441 is rotatably journaled on the pin 448 and is provided with a bushing 449 engaging the pin 448. The arm 444 is retained on the pin 448 by a retaining ring 450.

A tension spring 451 has an upper end thereof engaged with the pin 442 and the lower end thereof hooked into an ear 452 at the bottom of the chute 400. The spring 451 serves to urge the arm 437 in a clockwise direction, as viewed in FIGURE 23, to urge the finger 433 inwardly into the interior of the chute 400 and the finger 434 out of the chute 400. When the lever 430 is positioned as shown in FIGURE 23, any bottle disposed below the finger 433 has been released, and the finger 433 serves to hold all of the remaining bottles within the chute 400. On the other hand, when the lever 430 is pivoted in a counterclockwise direction to retract the finger 433 and inject the finger 434 into the chute 400, the lowermost bottle will move downwardly past the finger 433 and be arrested by the finger 434. This lowermost bottle may then be released when desired by swinging the lever 430 back to its position of FIGURE 23.

Reference is now made to FIGURE 22, wherein it is shown that a plate 453 is mounted on the top of the sprocket 127 and is secured thereto for rotation therewith by means of suitable fasteners 454. A plurality of upstanding support blocks 455 extends upwardly from the plate 453 and serve to support a circular table 456. The table 456, in turn, supports an annular spacer 457 which is disposed concentric about a central opening 458 in the table 456. A cam 460 is mounted on the spacer 457 and is secured in a circumferentially adjusted position by means of fasteners 461 which pass through arcuate slots 462 in the cam 460, as is shown in FIGURE 20. Attention is also directed to the fact that the fasteners 454 pass through arcuate slots 462 in the plate 453 to permit adjustment of the plate 453 with respect to the sprocket 127.

The bar 441 is provided at the lower end thereof with a cam follower 463 which is secured to the bar 441 by means of a stub axle 464. The cam follower 463 rides on the cam 460.

It is to be understood that the cam 460 is shaped so as to operate the bottle releasing mechanism 402 in a manner to release one bottle at a time in timed relation to the movement of the bottle holders 158 under the chute 400.

Figure 21:
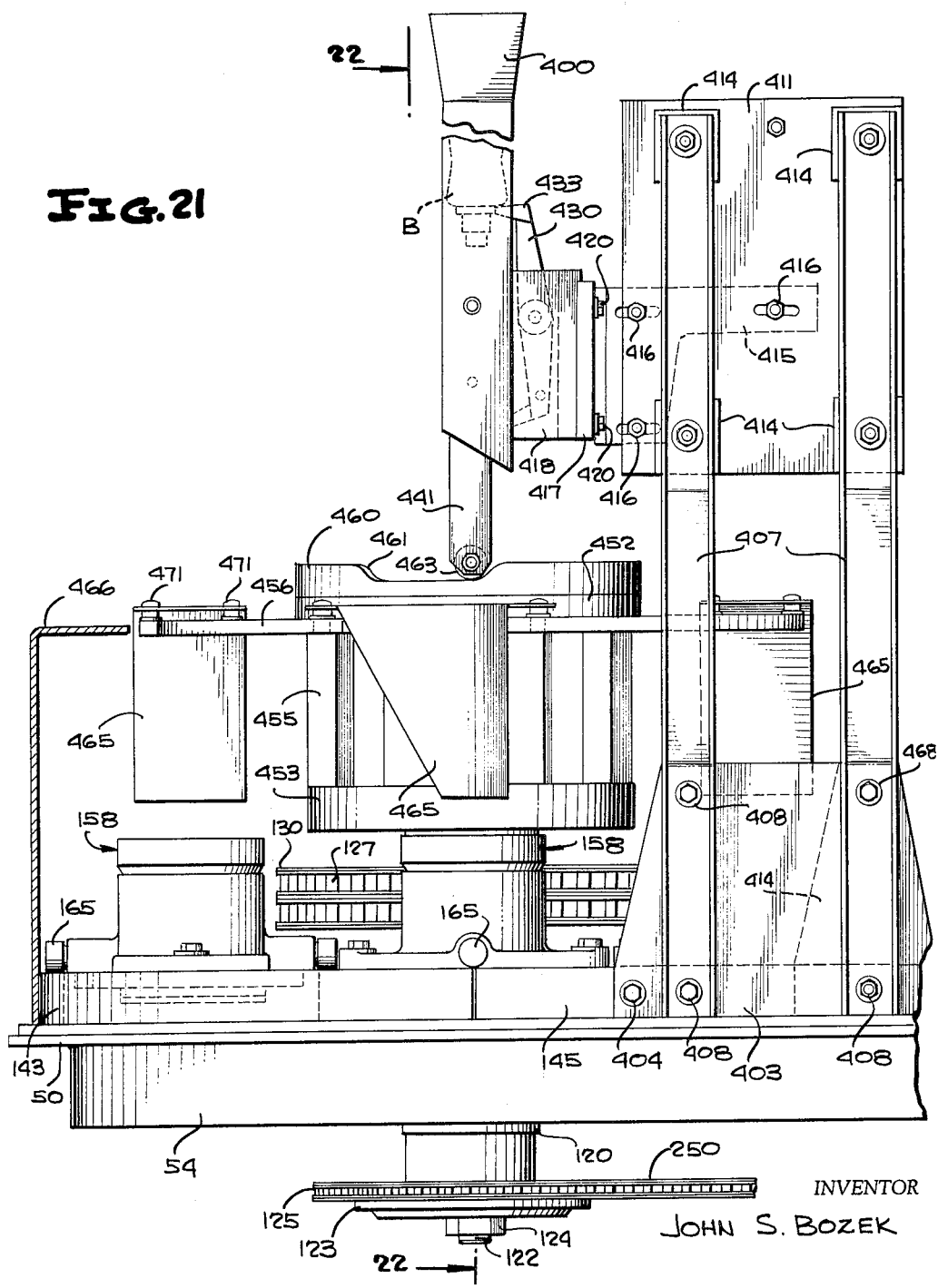
FIGURE 21 is an enlarged fragmentary side elevational view of the mechanism of FIGURE 20, with a portion of one of the guards being broken away and shown in section and more clearly shows the details of the bottle feed.

It is to be understood that when the bottles drop out of the lower end 401 of the chute 400, they will not necessarily fall directly into the bottle holders 158 in a directly upright position as is necessary. In view of this, the table 456 has the added function of carrying guides 465 which are generally funnel-shaped, as is shown in FIGURE 21. The guides 465 are carried by the table 456 and positioned in overlying relation to the bottle holders 158 as they pass directly beneath the chute 400. In this manner, the guides 465 assure the movement of the bottles into the bottle holders 158 in the desired manner. Incidentally, the guides 465 continue to move with the bottle holders 158 as they pass around the left end of the machine 30.

It is preferred that a guard 466 extend generally around the table 456 and the guides 465 carried thereby. The guard 466 is primarily secured to the rails 143 and 145. However, a transverse strap 467 is carried by the support 409, as is best shown in FIGURE 22, and has a fastener 468 which releasably secures the guard 466 to the strap 467.

*Operation of the bottle feed*

It is to be understood that in the bottle feed of FIGURES 20 through 27, the chute 400 is stationary and the guides 465 follow a circular path. On the other hand, the bottle holders 158 move in a straight line and pass tangentially into a circular path immediately below the circular path of the guides 465.

Referring now to FIGURE 25 in particular, it will be seen that when a bottle holder 158 is approaching a position beneath the chute 400, the lever 430 has pivoted to a position wherein the lower finger 436 is supporting the stack of bottles B within the chute 400. The finger 434 engages what is generally considered the shoulder of the bottle B. While the bottle holder 158 is still moving along its straight path and prior to the positioning of an associated guide 465 beneath the chute 400, the cam follower 463 rides down off the raised portion 469 of the cam 460 onto a lower portion 470 thereof with the result that due to the urging of the spring 451, the bar 441 moves downwardly and the lever 430 is pivoted in a counterclockwise direction, as viewed in FIGURE 25. This results in the releasing of the lowermost bottle B by the finger 434 while the finger 433 moves into position to underlie the next upper bottle and thus prevent additional bottles from dropping out of the chute 400. It is to be understood that at the time the bottle B is released, the associated guide 465, following a circular path, has not passed beneath the chute 400. At the same time, the bottle holder 158 for which the bottle is intended is still moving along its straight path and is not yet aligned with the associated guide 465. This is clearly shown in FIGURE 25.

Referring now to FIGURE 26, it will be seen that as the bottle is falling out of the lower end of the chute 400, the guide 465 is moving into position beneath the chute 400 so that the bottle may drop into the guide 465. At the same time, the bottle holder 158 is still moving along its straight path and has not reached a position aligned with the guide 465.

Referring now to FIGURE 27, it will be seen that the guide 465 has now moved into alignment with the chute 400. This occurs at approximately the time at which the bottle B is disposed fully within the guide 465 and passing out through the reduced lower opening thereof. At this time, the bottle holder 158 has moved into alignment with the guide 465 and is in position for receiving the bottle B from the guide 465. The guide 465 and the bottle holder 158 move together along the circular path of the guide 465 entirely about the left hand end of the machine 30 so that there is ample opportunity for the guide 465 to guide the bottle B into the bottle holder 158 in the desired alignment.

As the cam 460 continues to rotate with the remainder of the mechanism, the cam follower 463 will ride up onto another raised portion 469 of the cam 460 with the result that the lever 430 will be pivoted in a clockwise direction. This will result in the upper finger 433 being withdrawn from beneath the then lowermost bottle, releasing the stack of the bottles B for free falling through the chute 400. However, before the lowermost bottle B can drop too far through the chute 400, the lower finger 434 is pivoted into the chute 400 for engagement with the shoulder of the descending lowermost bottle to retain the same in the dotted line position of FIGURE 27. This is a completion of the bottle feed cycle.

At this time, it is pointed out that when the bottle feed of FIGURES 20 through 27 is utilized, it is not necessary for the bottle holders 158 to have a front opening to facilitate the reception of a bottle thereinto. It is also pointed out that by means of suitable inserts, such as the insert 171, the bottle holders 158 may be changed to accommodate bottles of different sizes. With respect to this adaptability of the bottle holders 158, it is to be understood that the guides 465 are replaceably carried by the table 456 and are secured in place by means of suitable fasteners, such as the fasteners 471 shown in FIGURE 21. When the bottle size is changed, the guides 465 must also be changed. A change in bottle size will also require a change in the size of the lower end of the chute 400 and in some instances, it will be necessary to vary the height of the exit end of the chute 400 above the table 465.

From the foregoing, it will be seen that there has been provided a novel machine for automatically receiving plastic bottles and while continuously moving the plastic bottles, performing the necessary operations on the necks of the plastic bottles, including the removing of the projecting waste. While a preferred embodiment of the invention has been illustrated and described, attention is directed to the fact that variations may be made in the example disclosed herein without departing from the spirit and scope of the invention, as defined in the appended claims.

I claim:

1. A machine for finishing necks of plastic bottles and the like comprising an endless conveyor including a plurality of holders for receiving bottles in inverted upright positions and movable continuously about a predetermined path, means for delivering bottles to said holders as said holders move, cutting means disposed along said path for removing excess waste material from bottle necks, reaming means mounted for movement along said path for remaining bottle necks of continuously moving bottles carried by said moving holders, and means for removing bottles with finished necks from said holders.

2. The machine of claim 1 wherein each of said holders is provided with a neck clamp for rigidly holding a bottle neck in a fixed position relative to the respective holder.

3. The machine of claim 1 wherein said cutting means includes a pair of cooperating disc cutters disposed on opposite sides of the center line of said path.

4. The machine of claim 1 wherein said bottle removing means include an air blast means disposed along said holder path of movement for blowing bottles up and out of said holders, said air blast means including a control valve and means for operating the same in timed relation to the movement of said holders.

5. The machine of claim 1 wherein said reaming means include at least one reamer, a support for said reamer, and support drive means for moving said support along the path of movement of said holders and in vertical alignment with one of said holders, and means for temporarily locking said reamer support to a respective one of said holders for movement therewith.

6. The machine of claim 1 wherein said reaming means include a first reamer portion for internally reaming a bottle neck, and a second reamer portion for facing the end of a bottle neck.

7. The machine of claim 1 wherein said reaming means include a first reamer portion for internally reaming a bottle neck, and a second reamer portion for facing the end of a bottle neck, and an air passage through said reamer portions for directing compressed air into a bottle for simultaneous resisting the entrance of reaming chips into a bottle and for blowing reaming chips therefrom during a reaming operation.

8. The machine of claim 1 wherein each bottle holder includes a removable bottle receiving insert wherein various types and shapes of bottles may be received in a bottle holder.

9. The machine of claim 1 wherein each of said holders has a pair of transversely spaced followers, and guide members extending on opposite sides of the path of movement of said holders.

10. A machine for finishing necks of plastic bottles and like articles comprising a plurality of holders, means for continuously moving said holders in spaced relation to each other along a predetermined path, and reaming means for reaming article necks carried by said holders, said reaming means including a plurality of reamers, a support carrying said reamers and drive means continuously moving said support in unison with said holders with said reamers aligned with said holders, whereby said reamers may accomplish the neck finishing operation during continuous movement of said holders, said reamers including a first reamer portion for internally reaming a bottle neck and a second reamer portion at right angles to said first reamer portion for facing the end of said bottle neck.

11. The machine of claim 10 wherein each of said reamers includes an air passage through said reamer portions for directing compressed air into a bottle for simultaneous resisting the entrance of reaming chips into a bottle and for blowing reaming chips therefrom during a reaming operation.

12. A machine for finishing necks of plastic bottles and like articles comprising a plurality of holders, means maintaining said holders in equally spaced relation and continuously moving said holders along a predetermined path including an arcuate portion having a single center, a turret-like support having a center of rotation co-axial with said arcuate portion center, a plurality of reamers, mounting means carried by said support mounting said reamers in spaced relation with the spacing of said reamers being the same as the spacing of said holders, means connected to said support for rotating said support with said reamers moving at the same speed as said holders and with said reamers in alignment with certain of said holders, whereby said reamers may accomplish the desired neck finishing operation during the continuous movement of said holders, said holders being particularly adapted to hold articles in inverted positions with the necks thereof facing downwardly, and article hold down means mounted for movement with said support and disposed in alignment with said reamers for engaging the upwardly facing ends of articles disposed within said holders to resist upward movement thereof during the reaming operation.

13. A machine for finishing necks of plastic bottles and like articles comprising a plurality of holders, means maintaining said holders in equally spaced relation and continuously moving said holders along a predetermined path including an arcuate portion having a single center, a turret-like support having a center of rotation co-axial with said arcuate portion center, a plurality of reamers, mounting means carried by said support mounting said reamers in spaced relation with the spacing of said reamers being the same as the spacing of said holders, means connected to said support for rotating said support with said reamers moving at the same speed as said holders and with said reamers in alignment with certain of said holders, whereby said reamers may accomplish the desired neck finishing operation during the continuous movement of said holders, each of said reamer mounting means including a support bearing, a shaft mounted in said support bearing for rotary and axial movement, means securing one of said reamers to said shaft upper end, means connected to said shaft for rotating said shaft relative to said support, and means for vertically reciprocating said shaft as said support rotates, each shaft and reamer assembly being hollow, and air supply means carried by said support and connected to said shafts for delivering air into articles through said reamers for removing chips formed in the reaming operation as the chips are formed.

14. A machine for finishing necks of plastic bottles and like articles comprising a plurality of holders, means maintaining said holders in equally spaced relation and continuously moving said holders along a predetermined path including an arcuate portion having a single center, a turret-like support having a center of rotation co-axial with said arcuate portion center, a plurality of reamers, mounting means carried by said support mounting said reamers in spaced relation with the spacing of said reamers being the same as the spacing of said holders, means connected to said support for rotating said support with said reamers moving at the same speed as said holders and with said reamers in alignment with certain of said holders, whereby said reamers may accomplish the desired neck finishing operation during the continuous movement of said holders, each article holder including clamp means for clamping the neck of an article disposed therein, said clamp means including a plurality of radiating clamp members, a cam member rotatably carried by the respective holder and connected to said clamp members for reciprocating said clamp members in response to rotation of said cam member, and means spaced along said path for rotating said cam member to automatically engage and release said clamp means.

15. Conveying apparatus for light weight articles including plastic bottles, said conveying apparatus comprising a plurality of article holders having open bottoms and arranged in equally spaced relation, means for moving said holders along a predetermined path, an air blast nozzle disposed along said path for directing a blast of air up through said holders to remove articles therefrom, an air blast control valve controlling flow of air to said air blast nozzle in timed relation to the alignment of said holders with said air blast nozzle, and drive means for said control valve driven by said means for driving said holders.

16. Conveying apparatus for light weight articles including plastic bottles, said conveying apparatus comprising a plurality of article holders having open bottoms and arranged in equally spaced relation, means for moving said holders along a predetermined path, an air blast nozzle disposed along said path for directing a blast of air up through said holders to remove articles therefrom, an air blast control valve controlling flow of air to said air blast nozzle in timed relation to the alignment of said holders with said air blast nozzle, drive means for said control valve driven by said means for driving said holders, and a suction tube in alignment with said air blast nozzle and disposed above said holder path for receiving articles removed from said holders.

17. The apparatus of claim 16 wherein there are two of said suction tubes spaced longitudinally of said holder path and one of said air blast nozzles for each suction tube, and said control is adjustable for delivering air to a selected one of said air blast nozzles.

18. A machine for finishing necks of plastic bottles and the like comprising an endless conveyor including a plurality of holders for receiving bottles in inverted upright positions and movable continuously about a predetermined path, means for delivering bottles to said holders as said holders move, cutting means disposed along said path for removing excess waste material from bottle necks, reaming means mounted for movement along said path for reaming bottle necks of continuously moving bottles carried by said moving holders, and means for removing bottles with finished necks from said holders, said means for delivering bottles including a gravity fed bottle chute, a bottle releasing mechanism connected to said bottle chute for releasing a single bottle upon actuation thereof, and means for actuating said bottle releasing mechanism in timed relation to the movement of said holders.

19. The machine of claim 18 wherein guide means are disposed above a portion of the path of said holders and intermediate said holders and said bottle chute for guiding bottles descending from said chute into said holders.

20. The machine of claim 18 wherein said means for actuating said bottle releasing mechanism is set to release a bottle in advance of the positioning of one of said holders beneath said chute with the releasing of the bottle being timed in accordance with the vertical spacing of the associated holder below said chute and the rate of movement of said holders.

21. The machine of claim 19 wherein said holders are carried by an endless conveyor supported by at least one large sprocket, and said guide means are supported by a rotary support mounted in overlying relation to said sprocket and coaxial therewith.

22. The machine of claim 19 wherein said guide means includes a plurality of guides each having a forward wall sloping downwardly and rearwardly as compared to the direction of movement thereof to provide clearance for a falling bottle.

23. The machine of claim 19 wherein said means for actuating said bottle releasing mechanism is set to release a bottle in advance of the positioning of one of said holders beneath said chute with the releasing of the bottle being timed in accordance with the vertical spacing of the associated holder below said chute and the rate of movement of said holders, and means moving said holders and said guide means at the same linear speed.

24. An apparatus for delivering articles from a chute into moving holders passing below said chute in spaced relation comprising bottle releasing mechanism on said chute, and means operable in accordance with the movement of said holder for actuating said bottle releasing mechanism to release a bottle in advance of the positioning of one of said holders beneath said chute with the releasing of the bottle being timed in accordance with the vertical spacing of the associated holder below said chute and the rate of movement of said holders.

25. The apparatus of claim 24 wherein guides moving generally with said holders are spaced intermediate said chute and said holders for assuring the movement of articles into said holders.

26. A reamer for reaming bottle necks, said reamer comprising a first reamer portion for internally reaming a bottle neck, and a second reamer portion for facing the end of a bottle neck, and an air passage through said reamer portions for directing compressed air into a bottle for simultaneously resisting the entrance of reaming chips into a bottle and for blowing reaming chips therefrom during a reaming operation.

References Cited by the Examiner

UNITED STATES PATENTS

| | | | |
|---|---|---|---|
| 150,281 | 4/1874 | Brengle | 77—72 |
| 167,127 | 8/1875 | Sandbach | 269—33 |
| 1,861,574 | 6/1932 | Larson et al. | |
| 1,946,420 | 2/1934 | Brown | 77—23 |
| 2,243,277 | 5/1941 | Honekamp | 29—923 |
| 2,394,700 | 2/1946 | Jongedyk. | |
| 2,509,056 | 5/1950 | Gartner. | |
| 2,738,866 | 3/1956 | Vamvakas et al. | 198—103 |
| 2,912,282 | 11/1959 | Schult | 302—2 |
| 2,968,975 | 1/1961 | Niemeyer | 77—55 |
| 3,127,636 | 4/1964 | Heider. | |

OTHER REFERENCES

"Bottle Finisher," "Modern Plastics" magazine, pp. 52 and 54, September 1961, 18–5B.

WILLIAM W. DYER, Jr., *Primary Examiner.*

FRANK H. BRONAUGH, *Examiner.*